United States Patent
Xie et al.

(10) Patent No.: US 9,348,560 B2
(45) Date of Patent: May 24, 2016

(54) EFFICIENT EXECUTION OF GRAPH-BASED PROGRAMS

(71) Applicant: QUALCOMM Incorporated, San Diego, CA (US)

(72) Inventors: Binglong Xie, San Diego, CA (US); Shuxue Quan, San Diego, CA (US); Ning Bi, San Diego, CA (US); Jianfeng Ren, San Diego, CA (US); Lei Xu, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/106,539

(22) Filed: Dec. 13, 2013

(65) Prior Publication Data

US 2014/0359563 A1    Dec. 4, 2014

Related U.S. Application Data

(60) Provisional application No. 61/831,087, filed on Jun. 4, 2013.

(51) Int. Cl.
*G06F 9/44* (2006.01)
*G06F 9/50* (2006.01)
*G06F 9/45* (2006.01)

(52) U.S. Cl.
CPC ........ *G06F 8/34* (2013.01); *G06F 8/451* (2013.01); *G06F 9/50* (2013.01); *G06F 9/5044* (2013.01); *Y02B 60/142* (2013.01)

(58) Field of Classification Search
CPC ....................................................... G06F 8/30
See application file for complete search history.

(56) References Cited

U.S. PATENT DOCUMENTS

| 7,800,620 | B2 | 9/2010 | Tarditi, Jr. et al. |
| 2007/0283358 | A1* | 12/2007 | Kasahara ............. G06F 9/5044 718/104 |
| 2009/0030863 | A1 | 1/2009 | Stanfill et al. |
| 2010/0180240 | A1* | 7/2010 | Davis ................. G06F 17/5031 716/113 |
| 2010/0299657 | A1 | 11/2010 | Barua et al. |
| 2010/0306736 | A1* | 12/2010 | Bordelon .............. G06F 8/452 717/109 |
| 2011/0078500 | A1 | 3/2011 | Douros et al. |

(Continued)

OTHER PUBLICATIONS

Sarkar, "Partitionng and Scheduling Parallel Programs for Multiprocessors", 1989, retrieved on Nov. 12, 2015 from http://www.cs.rice.edu/~vs3/PDF/Sarkar89.pdf.*

(Continued)

*Primary Examiner* — Philip Wang
(74) *Attorney, Agent, or Firm* — Toler Law Group, PC

(57) ABSTRACT

A method includes accessing, at a computing device, data descriptive of a graph representing a program. The graph includes multiple nodes representing execution steps of the program and includes multiple edges representing data transfer steps. The method also includes determining at least two heterogeneous hardware resources of the computing device that are available to execute code represented by one or more of the nodes, and determining one or more paths from a source node to a sink node based on a topology of the graph. The method further includes scheduling execution of code at the at least two heterogeneous hardware resources. The code is represented by at least one of the multiple nodes, and the execution of the code is scheduled based on the one or more paths.

9 Claims, 16 Drawing Sheets

(56) References Cited

U.S. PATENT DOCUMENTS

2013/0036408 A1* 2/2013 Auerbach ............... G06F 8/456
717/140
2014/0267377 A1* 9/2014 Halstvedt ............... G06T 11/40
345/613

OTHER PUBLICATIONS

Aldinucci, M., et al., "High Level Grid Programming with ASSIST," Computational Methods in Science and Technology, 2006, vol. 12, No. 1, Institute of Bioorganic Chemistry, Polish Academy of Sciences, Poznan Supercomputing and Networking Center, Poznan, Poland, pp. 1-11.

Beg, M.O., "Critical Path Heuristic for Automatic Parallelization," Technical Report CS-2008-16, Aug. 6, 2008, University of Waterloo, Waterloo, Ontario, pp. 1-15.

International Search Report and Written Opinion for International Application No. PCT/US2014/040532, ISA/EPO, Date of Mailing Oct. 13, 2014, 17 pages.

Khan, M.A., "Scheduling for Heterogeneous Systems Using Constrained Critical Paths," Parallel Computing, Apr. 2012, vol. 38, Issue 4-5, Elsevier, Amsterdam, Netherlands, pp. 175-193.

Partial International Search Report for International Application No. PCT/US2014/040532, ISA/EPO, Date of Mailing Aug. 27, 2014, 7 pages.

Vanneschi, M., "The Programming Model of ASSIST, an Environment for Parallel and Distributed Portable Applications," Parallel Computing, Dec. 2002, vol. 28, No. 12, Elsevier, Amsterdam, Netherlands, pp. 1709-1732.

* cited by examiner

C++ code:

```
qcv::Context    c(0);
qcv::Graph    g(&c);
qcv::CameraSource        camera(&g, "Camera");
qcv::RGBInterleaved2Planar  I2P(&g, "Interleaved2Planar");
qcv::NodeSplit2         split (&g, "Split");
qcv::ImageRGB2Gray      gray (&g, "Gray");
qcv::EdgeDetect         edge(&g, "Edge");
qcv::ImageSmooth        smooth(&g, "Smooth");
qcv::ImageBlend         blend (&g, "Blend");
qcv::RGBPlanar2Interleaved P2I (&g, "P2I") ;
qcv::WinDisplay         display(&g, "Display");

camera. getoutputPin ("output ") - >connect (*I2P. getInputpin (" input")) ;
I2P .getOutputPin("output") - >connect(*split.getInputPin ("input"));
split. getOJtputPin ("output0") - >connect (*gray.getInputPin ("input") ) ;
split. getOJtputPin ("output1") - >connect (*smooth. getInputPin("input") );
gray.getOutputPin( "output") - >connect(*edge.getInputPin ("input"));
edge. getOutputPin ("output") - >connect (*blend. getInputPin (" Input0") ) ;
smooth.getoutputPin("output")- >connect(*blend.getInputPin("input1"));
blend. getOutputPin ("output") - >connect (*P2I. getInputPin ("input"));
P2I.getOutputPin("output") - >connect (*display.getInputPin ("input"));

edge.setProperty( "LowThreshold", "4");
edge.setProperty( "HighThreshold", "30");
blend.setProperty ("Coefficient0", "0.5");
blend.setProperty ("Coefficient1", "0.5");

g.run( );
qcv::messageLoop( );
```

*FIG. 19*

Graphical programming load and run from file:

```
std::shared_ptr<Qcv::Graph> g = qvc::loadGraph("example.xml") ;
g - >run ( ) ;
qvc::messageLoop() ;
```

*FIG. 20*

XML

```xml
<qcvGraph version="1.0">
    <Context CpuThreads="4">
        <Graphs>
            <Graph Id="graph0" SchedulingPreference="HighThroughput" Comment=
                    "Runnable Graph on Windows, full frame Wavelets Denoising" >
        <Nodes>
            <Node Class="cameraNode" Id="cam" />
            <Node Class="NodeImageChannelSplitter3" Id="split3" />
            <Node Class="NodeImageChannelTypeConverterToInt32" Id="b2i0" />
            <Node Class="NodeImageChannel TypeConverterToInt32" Id="b2i1" />
            <Node Class="NodeImageChannelTypeConverterToInt32" Id="b2i2" />
            <Node Class="NodeImageChannelTypeConverterTdJint8" Id="i2b0" />
            <Node Class="NodeImageChannel TypeConverterTdJint8" Id="i2b1" />
            <Node Class="NodeImageChannelTypeConverterTdJint8" Id="i2b2" />
            <Node Class="NodeImageWaveletDenoising" Id="wd0" />
            <Node Class="NodeImageWaveletDenoising" Id="wd1" />
            <Node Class="NodeImageWaveletDenoising" Id="wd2" />
            <Node Class="NodeImageChannelJoiner3" Id="join3" />
            <Node Class="WinDisplay" Id="dispCam" />
            <Node Class="WinDisplay" Id="dispWD" />
        </Nodes>
        <Connections>
            <Connection FromNodeId="cam" ToNodeId="split3" />
            <Connection FromNodeId="split3" FromOutputPin="0" ToNodeId="b2i0" />
            <Connection FromNodeId="split3" FromOutputPin="1" ToNodeId="b2i1" />
            <Connection FromNodeId="split3" FromOutputPin="2" ToNodeId="b2i2" />
            <Connection FromNodeId="b2i0" ToNodeId="wda" />
            <Connection FromNodeId="b2i1" ToNodeId="wdl" />
            <Connection FromNodeId="b2i2" ToNodeId="wd2" />
            <Connection FromNodeId="wd0" ToNodeId="i2ba" />
            <Connection FromNodeId="wd1" ToNodeId="i2bl" />
            <Connection FromNodeId="wd2" ToNodeId="i2b2" />
            <Connection FromNodeId="i2b0" ToNodeId="join3" ToInputPin="0" />
            <Connection FromNodeId="i2b1" ToNodeId="join3" ToInputPin="1" />
            <Connection FromNodeId="i2b2" ToNodeId="join3" ToInputPin="2" />
            <Connection FromNodeId="join3" ToNodeId="dispWD" />
            <Connection FromNodeId="cam" ToNodeId="dispcam" />
        </Connections>
        </Graph>
        </Graphs>
    </Context>
    <Layout>
        <!-- Layout is only used to visualize the graph, e.g., in qcvStudio. qcvGraph
                core will not attempt to consume it. -->
    </Layout>
</ qcvGraph>
```

FIG. 21

EFFICIENT EXECUTION OF GRAPH-BASED PROGRAMS

I. CROSS-REFERENCE TO RELATED APPLICATIONS

The present application claims priority to and the benefit of U.S. Provisional Patent Application No. 61/831,087, filed Jun. 4, 2013, the content of which is expressly incorporated herein by reference in its entirety.

II. FIELD

The present disclosure is generally related to efficient execution of graph-based programs.

III. DESCRIPTION OF RELATED ART

Advances in technology have resulted in smaller and more powerful electronic devices and communication systems. For example, there currently exist a variety of mobile devices, such as wireless telephones, personal digital assistants (PDAs), computer tablets, and paging devices. The mobile devices may be small, lightweight, and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio stream player. Also, wireless telephones can process executable instructions, including software applications, such as a web browser application, that can be used to access the Internet. As such, wireless telephones and other mobile devices can include significant computing capabilities. However, utilizing these computing capabilities may involve a large amount of coding by computer programmers, which can be expensive and time-consuming.

Graph-oriented programming (GOP) (also referred to herein as "graph-based programming") provides one way for computer programmers to generate code. For example, computer programmers may create a functional graph that describes the program in terms of operations and interconnections. To illustrate, the functional graph may include or describe nodes corresponding to operations and edges corresponding to interconnections between the nodes. The functional graph may also illustrate certain sequences of operations. Executing a program based on such a functional graph may be resource intensive, which may impede functioning of a mobile device by consuming processing resources for an extended period of time or by consuming power resources of the mobile device.

IV. SUMMARY

While using graph-based programming to generate programs may help programmers assemble programs more quickly and efficiently, execution of such programs on some hardware platforms can be inefficient. For example, when the program is executed on a first hardware platform that has a first set of processing resources, the program may execute relatively efficiently (e.g., quickly or with low power usage). However, when the program is executed on a second hardware platform that has a different set of processing resources, the program may execute relatively inefficiently (e.g., slowly or with high power usage).

Techniques are disclosed for graph-based programming. The disclosed techniques enable graph-based programming for a particular parallel computing platform of a device that is to implement the graph-based programming. For example, program code may be generated based on a graph entered by a user. The graph may include a node corresponding to a task that can be divided into multiple sub-tasks to be performed in parallel at the device. The program code may include a state indicator indicating a statefulness characteristic of the node. The statefulness characteristic may indicate whether the sub-tasks may be performed in parallel (e.g., whether it is "safe" to execute the sub-tasks in parallel). By indicating the statefulness characteristic of the node, performance of execution of the program code may be improved, such as by avoiding overwriting of data during execution of the sub-tasks, as described further below.

Further, while using graph-based programming to generate programs may assist programmers to assemble programs more quickly and efficiently, execution of such programs on some hardware platforms can be inefficient. For example, when the program is executed on a first hardware platform that has a first set of processing resources, the program may execute relatively efficiently (e.g., quickly or with low power usage). However, when the program is executed on a second hardware platform that has a different set of processing resources, the program may execute relatively inefficiently (e.g., slowly or with high power usage).

Accordingly, techniques are disclosed to efficiently execute a graph-based program on various hardware platforms by scheduling execution of portions of the program at different processing devices (or other hardware resources) depending on a topology of a graph representing the program. Thus, efficient execution of graph-based programs may be achieved based on the topology of the graph and based on a set of available hardware resources of one or more hardware platforms.

In a particular embodiment, a method includes accessing, at a computing device, data descriptive of a graph representing a program. The graph includes multiple nodes representing execution steps of the program and includes multiple edges representing data transfer steps. The method also includes determining at least two heterogeneous hardware resources of the computing device that are available to execute code represented by one or more of the nodes, and determining one or more paths from a source node to a sink node based on a topology of the graph. The method further includes scheduling execution of code at the at least two heterogeneous hardware resources. The code is represented by at least one of the multiple nodes, and the execution of the code is scheduled based on the one or more paths.

In another particular embodiment, an apparatus for generating, for a particular parallel hardware configuration, a program based on a graph associated with an application includes a memory and a processor. The memory is configured to store data descriptive of a graph. The graph includes a first node representing a first execution task of a program, a second node representing a second execution task of the program, and an edge representing a data transfer between the first node and the second node. The processor is configured to generate, based on the data, program code of the program. The program code includes a first state indicator associated with the first node and indicates a first statefulness characteristic of the first execution task.

In another particular embodiment, an apparatus for generating, for a particular parallel hardware configuration, a program based on a graph associated with an application includes means for storing data descriptive of a graph. The graph includes a first node representing a first execution task of a program, a second node representing a second execution task of the program, and an edge representing a data transfer between the first node and the second node. The apparatus further includes means for generating, based on the data, program code of the program. The program code includes a first state indicator associated with the first node and indicates a first statefulness characteristic of the first execution task.

One particular advantage provided by at least one of the disclosed embodiments is that efficient execution of graph-based programs may be achieved based on the topology of the graph and based on a set of available hardware resources of a hardware platform. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 16:
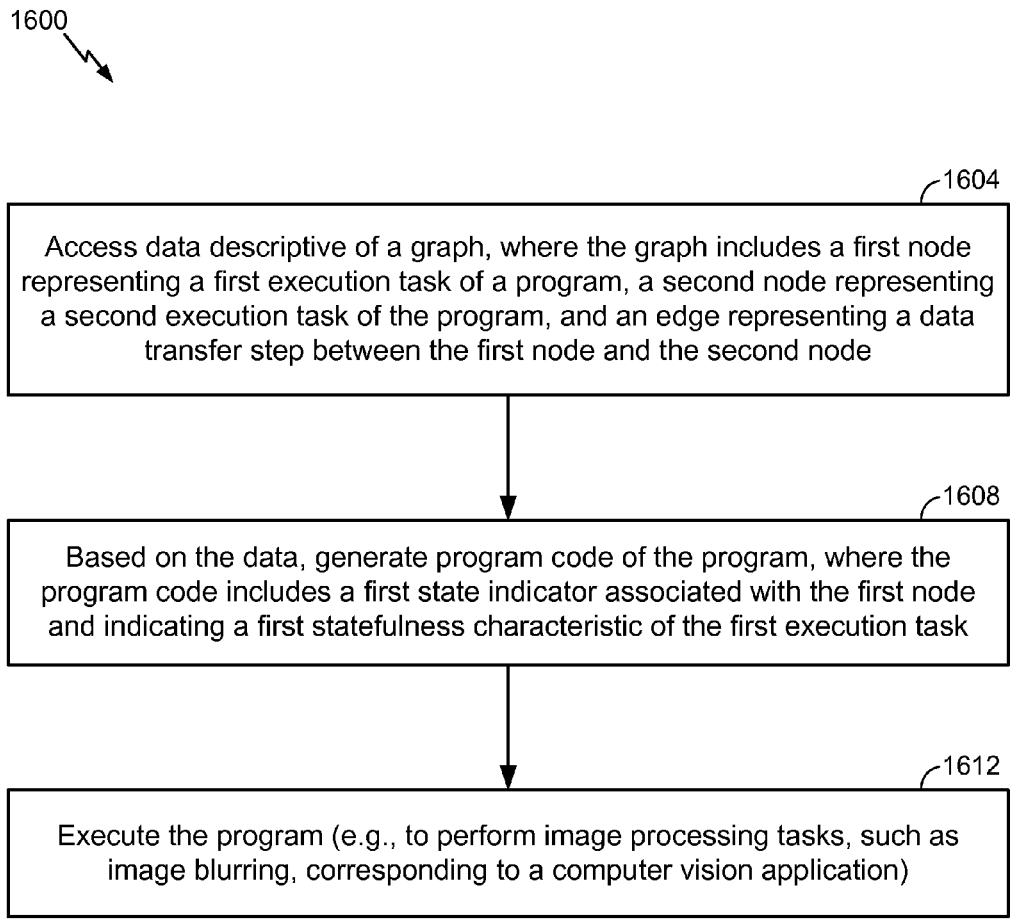
Figure 17:
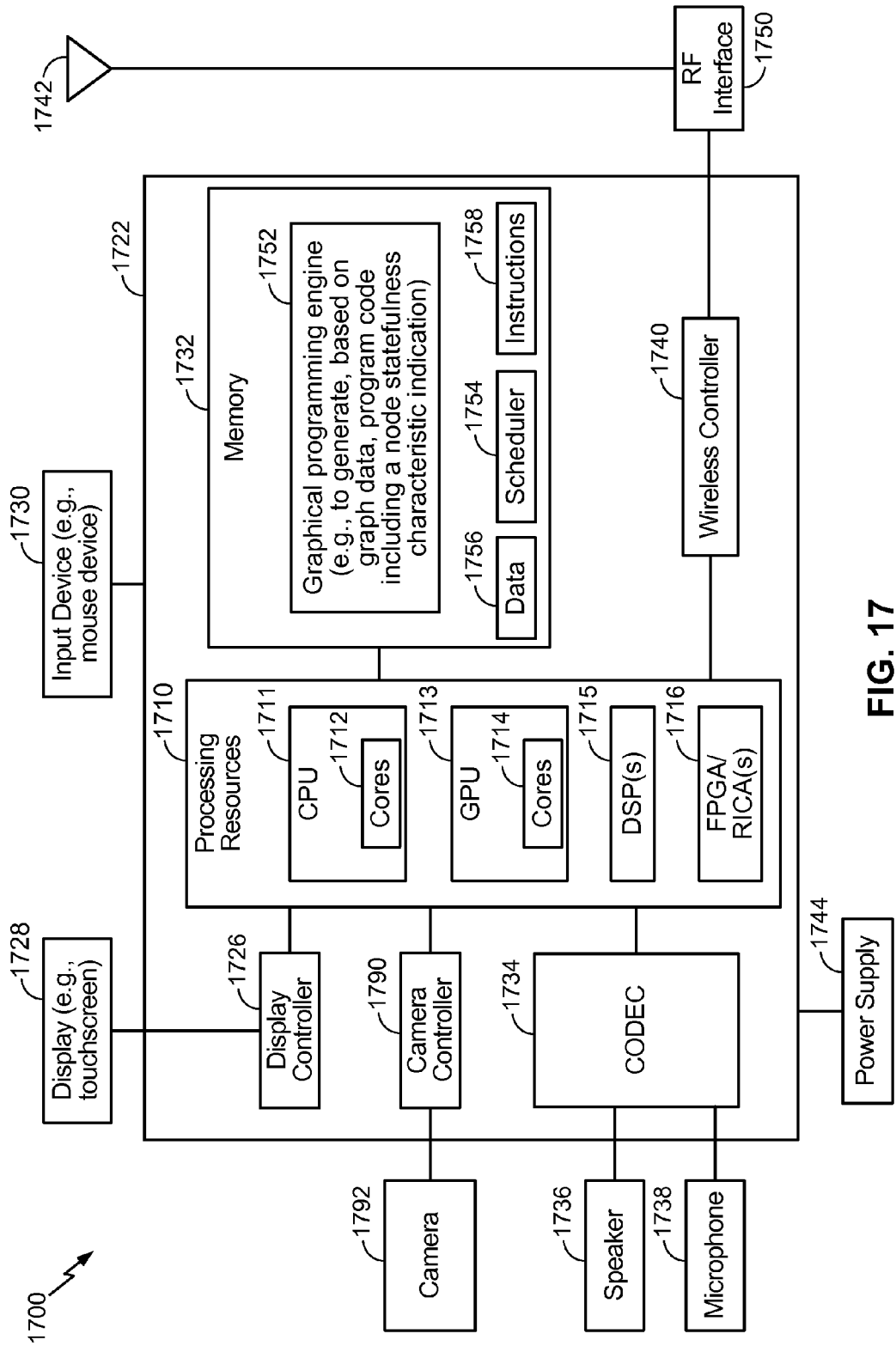

FIG. 16 is a flow chart illustrating a particular embodiment of a method of generating, for a particular parallel hardware configuration, a program based on a graph associated with a computer vision application; and FIG. 17 is a block diagram of a particular illustrative embodiment of a mobile device; and FIGS. 18-21 illustrate various embodiments of data descriptive of a graph representing a program.

VII. DETAILED DESCRIPTION

Figure 1:
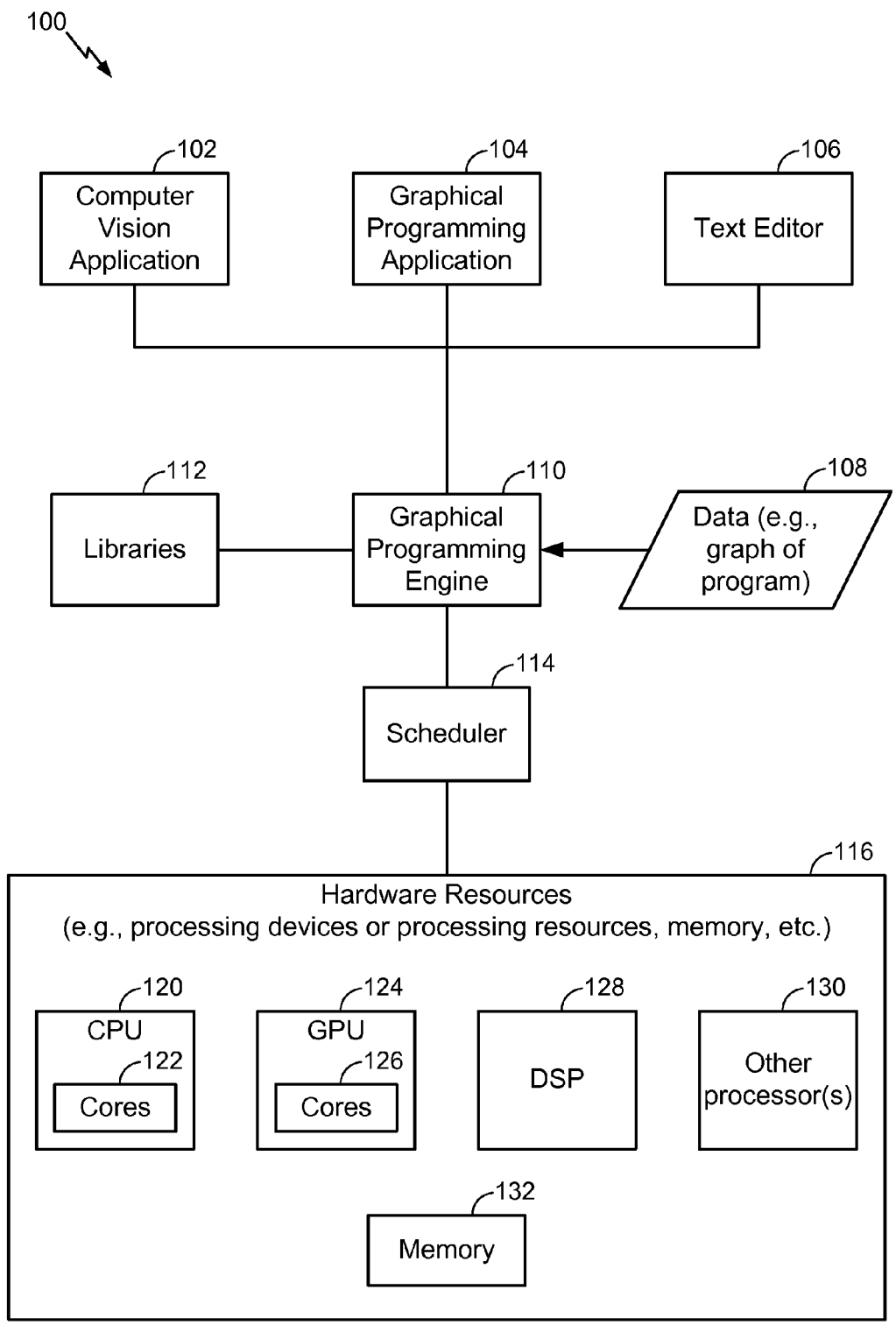
FIG. 1 depicts a particular embodiment of a system to enable efficient execution of programs on available hardware resources.

FIG. 1 depicts a particular embodiment of a system to enable efficient execution of programs on available hardware resources. In particular, the programs may include graphical programs generated based on data representing a graph. The graph may include multiple nodes representing execution steps of the program and may include multiple edges representing data transfer steps, as further described with reference to FIG. 2.

The system 100 includes a plurality of hardware resources 116 of a computing device, such as a computer, a portable computing device, a mobile computing device, a wireless telephone, a personal digital assistant (PDA), a computer tablet, or a paging device. The hardware resources 116 may include, for example, processing units and memory 132 accessible to the processing units. The processing units may include, for example, one or more central processing units (CPUs) 120, one or more graphical processing units (GPUs) 124, one or more digital signal processors (DSPs) 128, other processors 130 (e.g., field programmable gate arrays (FPGAs), FPGA-like devices, and/or reconfigurable instruction cell array (RICA) devices), or a combination thereof. One or more of the processing units may include more than one processing core. For example, each of the one or more CPUs 120 may include multiple processing cores 122. As another example, each of the one or more GPUs 124 may include multiple processing cores 126. The hardware resources 116 may be accessible to a scheduler 114 to schedule execution code represented by one or more nodes of the program. Execution of code represented by a node may be referred to herein as execution of the node to simplify the description.

The system 100 also includes a graphical programming engine 110. The graphical programming engine 110 is operable to access data descriptive of the graph representing the program, such as data 108. The data 108 may include graphical information (e.g., shapes, text and interconnections between shapes), program code (e.g., C++ program code), mark-up language text (e.g., eXtensible Markup Language (XML) text), other information that specifies nodes and connections between nodes, or a combination thereof. In a particular embodiment, the graph represented by the data 108 may be a directed acyclic graph. The data 108 may also define a context in which execution of the program is to occur. For example, the context may include information describing the hardware resources 116.

The graphical programming engine 110 may access the data 108 descriptive of the graph from one or more user applications, such as a computer vision application 102, a graphical programming application 104, a text editor 106, or another application. Additionally, the graphical programming engine 110 may have access to or include one or more libraries 112. The libraries 112 may include executable code corresponding to functions of particular nodes. For example, when forming code based on a graph, the graphical programming engine 110 may map elements of the graph, represented by the data 108, to the libraries 112 to select executable code.

The scheduler 114 may be a component of the graphical programming engine 110 or may separate from the graphical programming engine 110. The scheduler 114 may schedule execution of nodes of the graph at particular hardware resources in a manner that is efficient, (e.g., in a manner that reduces power consumption of the computing device, in a manner that reduces processing time associated with the program, in a manner that reduces latency of processing particular data, or a combination thereof).

During operation, information describing the program may be received. In a particular embodiment, the information describing the program may be received as a visual representation of the graph (e.g., shapes defined in a graphics file). In this embodiment, the graphical programming engine 110 may generate the data 108 by processing the visual representation of the graph to generate executable code corresponding to the multiple nodes. For example, the information describing the program may be received as a visual representation, and the graphical programming engine 110 may generate a computer-generated functional graph corresponding to the visual representation. The computer-generated functional graph may include multiple nodes, each representative of a functional block, a decision block, or a combination thereof. Each node of the computer-generated functional graph may include a pin that connects the node to another node of the computer-generated functional graph via an interconnection or edge.

The graphical programming engine 110 may access the data 108 and determine particular hardware resources of the hardware resources 116 that are available to execute one or more nodes of the program. The graphical programming engine 110 may also map code from the libraries 112 to the nodes to define specific processing steps to be performed to execute each node.

To execute the program efficiently, the graphical programming engine 110 or the scheduler 114 may determine one or more paths from a source node (e.g. an initial node of the graph) to a sink node (e.g., a last node of the graph) based on topology of the graph, as further described with reference to FIG. 2. The scheduler 114 may schedule execution of at least one node at a particular hardware resource of the hardware resources 116 based on the one or more paths.

In a particular embodiment, scheduling execution of at least one of the nodes at a particular hardware resource may include selecting one or more paths as a limiting path (or critical path) based at least in part on topology of the graph. For example, the limiting path may refer to the path that includes a largest number or count of nodes between the source node and the sink node. As another example, the limiting path may be selected based on a cost function associated with each node, a cost function associated with each edge, other cost functions, or a combination thereof. The cost function of the particular node may correspond to execution time associated with the particular node, power used to execute instructions corresponding to the particular node, processing latency associated with the particular node, or a combination thereof. In a particular embodiment, the cost function associated with each node or with each edge may have a fixed value. For example, the fixed value may be determined ahead of time (e.g., before execution of the program at the system 100) based on the particular hardware resources 116, or based on the program code used to form the program (e.g., from the libraries 112). In another example, a cost function associated with a particular node may be determined based on a statistical analysis of historical data associated with execution of program code corresponding to execution of the particular node at the computing device. For example, when the particular node is an image processing function, such as face detection, and the particular node has been executed at the computing device on a prior occasion, statistics associated with the particular node may be stored at the memory 132 and may be used to estimate the cost of executing the particular node at one or more of the hardware resources 116.

In a particular embodiment, a path that has the longest time to traverse from the source node to the sink node may be selected as the limiting path. In this embodiment, the limiting path is a particular path that is expected to take the longest time to execute each of the nodes, to perform data transfers between nodes, and to synchronize data when two data paths join at a particular node (as described further with reference to FIG. 2). In another embodiment, a path that uses a particular power (e.g., the most power) to traverse from the source node to the sink node may be selected as the limiting path. In this embodiment, the limiting path is a particular path that is expected to use the most power to execute each of the nodes, to perform data transfers between nodes, and to synchronize data when two data paths join at a particular node. In other embodiments, other cost functions associated with the paths may be used to select the limiting path, such as frame latency.

In a particular embodiment, after selection of the limiting path, nodes that are associated with the limiting path (e.g., form part of the limiting path) may be scheduled for execution at a particular set of resources of the hardware resources 116, and other nodes, which are not associated with the limiting path (e.g., do not form part of the limiting path), may be scheduled for execution at other hardware resources of the hardware resources 116. For example, the nodes of the limiting path may be scheduled for execution at the CPU 120, and the other nodes of the program, which do not form part of the limiting path, may be scheduled for execution at other hardware resources, such as the GPU 124, the DSP 128, or the other processors 130.

Nodes may be scheduled for execution at particular ones of the hardware resources 116 based on a cost function. For example, the cost function may be determined based on a number and type of each of the hardware resources 116. To illustrate, historical data or statistical data may be used to estimate an execution time of each node at each available hardware resource. Further, the historical data or statistical data may be used to estimate a transfer time associated with transferring data from one hardware device to another hardware device to implement each edge, and a synchronization time associated with synchronizing data from multiple nodes at a single node. As a particular example, in an illustrative embodiment, the hardware resources 116 include four CPU cores 122, one DSP 128, one GPU core 126, and one other processing device 130. Also, in the illustrative embodiment, all data transfers are routed through a CPU core 122. For example, to move data from the DSP 128 to the other processing device 130, the data is routed from the DSP 128 to a CPU core 122 and is subsequently routed from the CPU core 122 to the other processing device 130. For this illustrative embodiment, a minimum value of the cost function may be determined by evaluation of:

$$\text{argmax}_{i=1,\ldots,7}\left\{\sum_{j=1}^{m}(x_{ji}T_i^j + \max(t_j, W_j))\right\}$$

where m is the number of nodes of the graph, $x_{ji}$ is a binary value (e.g., 0 or 1) used to select particular hardware resources (and corresponding edges) by zeroing out particular terms, $T_i^j$ is an estimated execution time of a particular node j for one of the hardware resources i (where $T_i^j \in \{T_c, T_d, T_g, T_r\}$ (where subscript c denotes a CPU core, subscript d denotes a DSP, subscript g denotes a GPU core and subscript r denotes another processing device, such as a RICA device), $t_j$ is an estimated communication delay time of a particular node j, and $W_j$ is an estimated wait time for synchronization for the particular node j. The cost function may be constrained such that:

$$\Sigma_{i=1}^{7} x_{ji} = 1,$$

This constraint implies that only one $x_{ji}$ may have a value of 1 at a particular time (e.g., that other $x_{ji}$ values are zero).

Nodes may be scheduled for execution at particular ones of the processing resources in a manner that reduces or minimizes the cost function.

During or before execution of the program, the scheduler 114 may determine whether a particular node is tileable. A tileable node is a node that is associated with a function or operation that can be divided. For example, when a tileable node performs an operation on a dataset, the operation may be implemented by dividing the dataset into multiple subsets, performing the operation on each subset to generate a subset result, and merging the subset results to form an operation result. The operation may be implemented on each subset by generating multiple instances of the node and providing one or more of the subsets to each instance. Thus, for example, each instance of the node may operate (simultaneously, concurrently, or sequentially) on a different subset of a dataset provided to the node. After execution of each instance on a corresponding subset of the dataset, node results may be generated by combining subset results of the multiple instances.

Examples of tileable nodes include nodes that implement certain image processing operations (such as blurring and feature detection, edge detection, corner detection, or face detection) in which discrete portions of an image can be processed separately from a remainder of the image. For example, a blurring operation may be performed by dividing the image into separate portions, referred to herein as "tiles." Blurring may be performed on each tile separately, and the blurred tiles may be joined to form a blurred image.

After determining that a particular node is tileable, the scheduler 114 may schedule execution of a first instance of the particular node at a first hardware resource of the hardware resources 116 and may schedule execution of a second instance of the particular node at a second hardware resource of the hardware resources 116. The first instance and the second instance may be scheduled to execute simultaneously, concurrently, or sequentially. For example, a particular node may be executed by dividing a dataset provided to the particular node (such as an image) into subsets (e.g., tiles) which may be executed in parallel (simultaneously or concurrently) in order to distribute processing across multiple hardware resources 116 in an efficient manner.

As a specific example, when a particular node represents a face detection operation on image data, the scheduler 114 may schedule execution of the face detection operation at more than one of the hardware resources 116. For example, the scheduler 114 may schedule execution of a first instance of the face detection operation at a first hardware resource (e.g., the CPU 120) and may schedule execution of a second instance of the face detection operation at a second hardware resource (e.g., the GPU 124). The first instance of the face detection operation may operate on a first portion of the image data, and the second instance of the face detection operation may operate on a second portion of the image data. As another example, the scheduler 114 may schedule execution of a first instance of the face detection operation at a first core of a multicore processing device (e.g., the CPU 120) and may schedule execution of a second instance of the face detection operation at a second core of the multicore processing device (e.g., the CPU 120). As yet another example, the scheduler 114 may schedule execution of a first instance of the face detection operation at a first thread of a multithread processing device (e.g., the GPU 124) and may schedule execution of a second instance of the face detection operation at a second thread of the multithread processing device (e.g., the GPU 124). The first and second instances of the face detection operation may be performed simultaneously, concurrently or sequentially. Face detection data from the first and second instances may be combined to form an output of the particular node.

In another example, a face detection operation may be performed on an image by generating multiple scaled copies of the image, each at a different resolution. The face detection operation may attempt to detect faces in each of the scaled copies in order to identify faces of different sizes within the image. In this example, the graphical programming engine 110 or the scheduler 114 may modify original image data to generate modified image data corresponding to one of the scaled copies. Thus, the modified image data may have a different resolution than the original image data. The scheduler 114 may schedule execution of one instance of the face detection operation for each of the scaled images. For example, a first face detection operation instance may perform face detection on the original image data (at the original resolution), a second face detection operation instance may perform face detection on first scaled image data (at a first reduced resolution), a third face detection operation instance may perform face detection on second scaled image data (at a second reduced resolution), and so forth. The face detection operations may be executed concurrently, simultaneously or sequentially with one another in order to perform face detection on the entire image data. Additionally, the face detection operation instances may be scheduled for execution at two or more different hardware resources. For example, the first face detection operation instance may be executed at the CPU 120, the second face detection operation instance may be executed at the GPU 124, and the third face detection operation instance may be executed at the DSP 128. Although three face detection operation instances are described herein, a face detection operation may be performed using more than three instances or fewer than three instances.

In a particular embodiment, the program described by the data 108 may operate on video data (e.g., a plurality of time sequenced image frames). In this embodiment, the scheduler 114 may schedule execution of the source node on a particular frame of the image data before the sink node receives processed image data corresponding to a prior frame in the time sequence. Thus, before a first frame of image data is entirely processed by the program, processing of a second (subsequent) frame of the image data may begin execution at one or more of the hardware resources 116.

Accordingly, the graphical programming engine 110 and the scheduler 114 enable efficient execution of graphical-based programs at available hardware resources 116. When the hardware resources of a particular computing device are different from the hardware resources 116 illustrated in FIG. 1, the scheduler 114 and the graphical programming engine 110 adapt and schedule execution of the program to efficiently match the available hardware resources of the computing device to execution of the program. Accordingly, the hardware resources 116 may vary from one computing device to another computing device, and the graphical programming engine 110 and scheduler 114 enable efficient execution of the program on the particular set of hardware resources that are available at the particular computing device.

Figure 2:
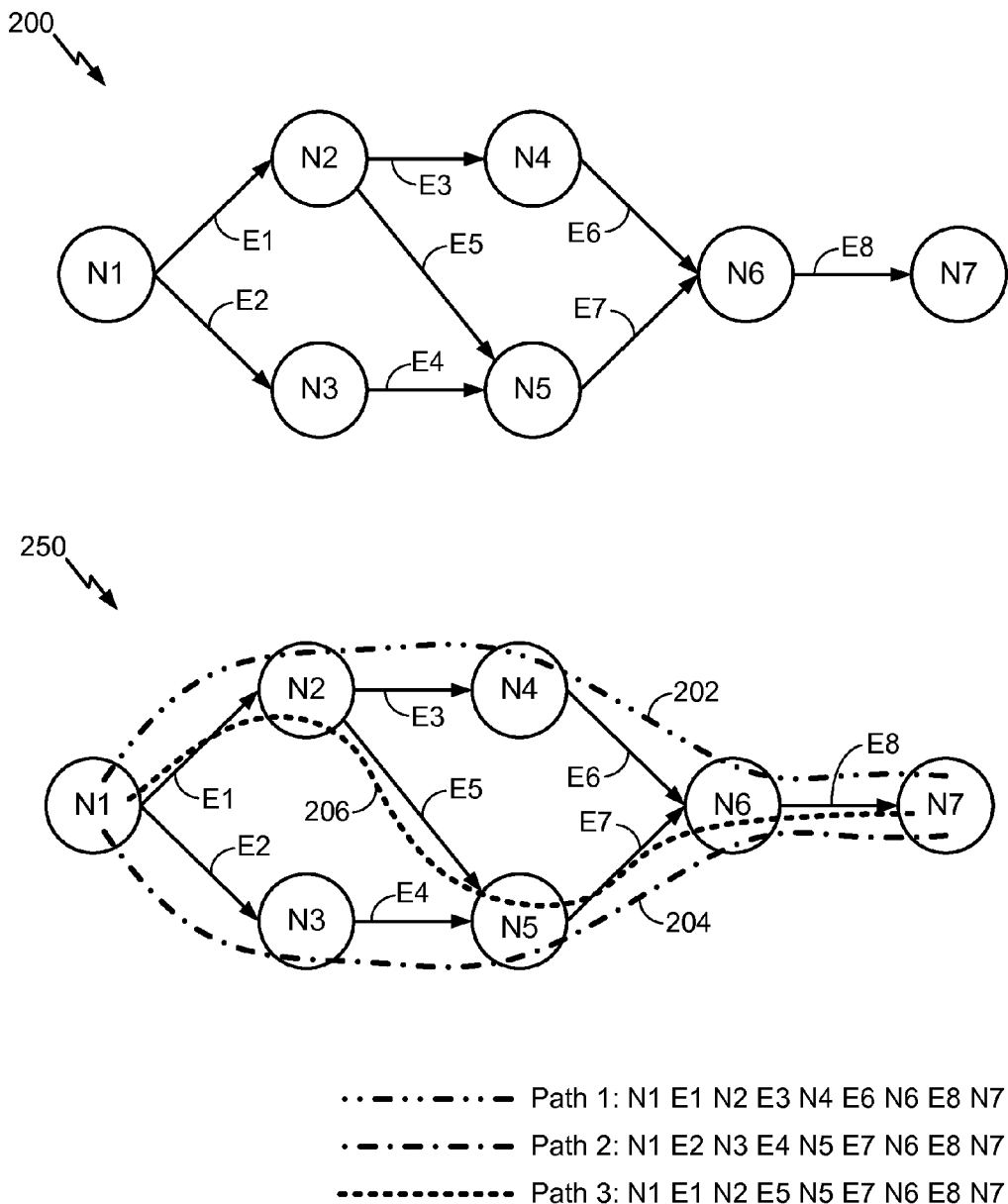
FIG. 2 illustrates particular embodiments of a graphical representation of a program including multiple nodes.

FIG. 2 illustrates particular embodiments of a graphical representation of a program including multiple nodes. A first graphical representation 200 illustrates a graph of a program. In the graph, nodes N1-N7 represent operations of the program. The nodes N1-N7 are connected to one another by edges E1 through E8 to define a topology of the graph. A second graphical representation 250 in FIG. 2 illustrates paths to traverse the graph based on the topology.

In the graph illustrated by the first and second graphical representations 200, 250, the node N1 may be referred to as a source node because the node N1 has no inputs from other nodes. The node N7 may be referred to as a sink node because the node N7 does not provide output to another node. The node N1 may be coupled via edge E1 to node N2 and may be coupled via edge E2 to node N3. The node N2 may be coupled via edge E3 to node N4 and via edge E5 to node N5. The node N3 may be coupled via edge E4 to node N5. The node N4 may be coupled via edge E6 to node N6, and the node N5 may be coupled via edge E7 to node N6. The node N6 may be coupled to the node N7 via edge E8.

As illustrated in the second graphical representation 250, there are three paths to traverse the graph from the source node (e.g., the node N1) to the sink node (e.g., the node N7). A first path 202 includes node N1, edge E1, node N2, edge E3, node N4, edge E6, node N6, edge E8, and node N7. A second path 204 includes node N1, edge E2, node N3, edge E4, node N5, edge E7, node N6, edge E8, and node N7. A third path 206 includes node N1, edge E1, node N2, edge E5, node N5, edge E7, node N6, edge E8, and node N7.

In the embodiment illustrated in FIG. 2, a limiting path (or critical path) of the graph may be a path that is associated with a largest cost to traverse from the source node N1 to the sink node N7. The cost of each path may be determined based on a sum of costs of each node in the path, plus a sum of costs of each edge in the path, plus synchronization costs of the path. Synchronization cost is related to delays that occur due to a node receiving multiple inputs to generate an output. For example, the node N5 receives input from the node N2 and from the node N3 in order to generate an output to the node N6. Accordingly, regardless of the time required by node N2 to provide input to the node N5, the node N5 may not provide output to the node N6 until data is received from the node N3. Thus, the node N5 has a synchronization cost to account for this potential processing delay.

When the nodes N1-N7 have been executed multiple times on a particular set of hardware resources (such as the hardware resources 116 of FIG. 1), a cost associated with each node may be known with reasonable certainty. In this case, costs associated with execution of each of the nodes N1-N7, costs associated with data transfers at the edges E1-E8 (e.g., data transfer constraints), and synchronization costs may be set to fixed values.

In another example, when the nodes N1-N7 have not been executed frequently on the particular available hardware resources, the costs associated with execution of each of the nodes N1-N7, costs associated with data transfers at the edges E1-E8, synchronization costs, or a combination thereof, may not be well known. In this example, the costs may be estimated based on statistical analysis of historical information related to execution of one or more of the nodes N1-N7, data transfers of one or more of the edges E1-E8, or both. For example, the libraries 112 of FIG. 1 may include information used to generate each node and may include information about expected execution times for each node (such as a probability distribution function or other statistical information descriptive of expected execution time of a particular hardware resources). To illustrate, predicted execution time of the node N1 for a particular dataset (e.g., an image having a particular resolution) on the CPU 120 of FIG. 1 may be associated with a probability distribution function stored at the libraries 112. The probability distribution function may be used to estimate the cost of executing the node N1 in terms of time, processing power, or latency. Likewise, each of the other nodes N2-N7 may be associated with statistical information indicating expected time or range of times or other parameters associated with execution of the particular node at particular hardware resources.

Costs associated with data transfers between the hardware resources 116 may be indicated by information in the libraries 112 or the memory 132. Such costs may be used to estimate edge costs depending on particular locations at which each node is scheduled for execution. To illustrate, when the node N1 is scheduled for execution at a first core, such as a core 122 of the CPU 120, and the node N2 is scheduled for execution at a second core, such as a core 126 of the GPU 124, data transfer cost associated with the edge E1 may be estimated based on known properties or historical statistical information associated with data transfers between the first core and the second core. A cost function may also account for data transfer constraints of a computing device. For example, a particular computing device may be configured such that data transfers between a first hardware resource and a second hardware resource are routed through a third hardware resource. In this example, cost of two different data transfer steps (e.g., from the first hardware resource to the third hardware resource, and from the third hardware resource to the second hardware resource) are accounted for in the cost function.

Synchronization costs may also be estimated based on historical statistical data associated with one or more of the nodes N1-N7 and with prior executions of the program or similar programs. For example, a time to receive input from the node N2 at the node N5 may be estimated based on a time to execute the node N1, the edge E1, the node N2, and the edge E5. Further, a time to receive input from node N3 at the node N5 may be estimated based on a time to execute the node N1, the edge E2, the node N3, and the edge E4. A difference between the time to receive input from the node N2 and the time to receive input from the node N3 may provide an estimate of synchronization cost associated with node N5.

Thus, based on estimated costs of executing each node, executing data transfers associated with each edge, and synchronization cost, a limiting path may be identified. The limiting path may be associated with a largest cost (e.g., longest time, largest power usage, largest latency, etc.) among the paths. To enable efficient execution of the program, cost associated with executing the limiting path may be reduced. For example, each node and data transfer of the limiting path may be scheduled, by the scheduler 114 FIG. 1, for execution at an efficient hardware resource of the hardware resources 116. To illustrate, the limiting path may be assigned for execution to the CPU 120 and nodes associated with non-limiting paths may be scheduled for execution at other hardware resources 116. Accordingly, by reducing execution cost associated with the limiting path, overall execution of the program may be performed efficiently.

Figure 3:
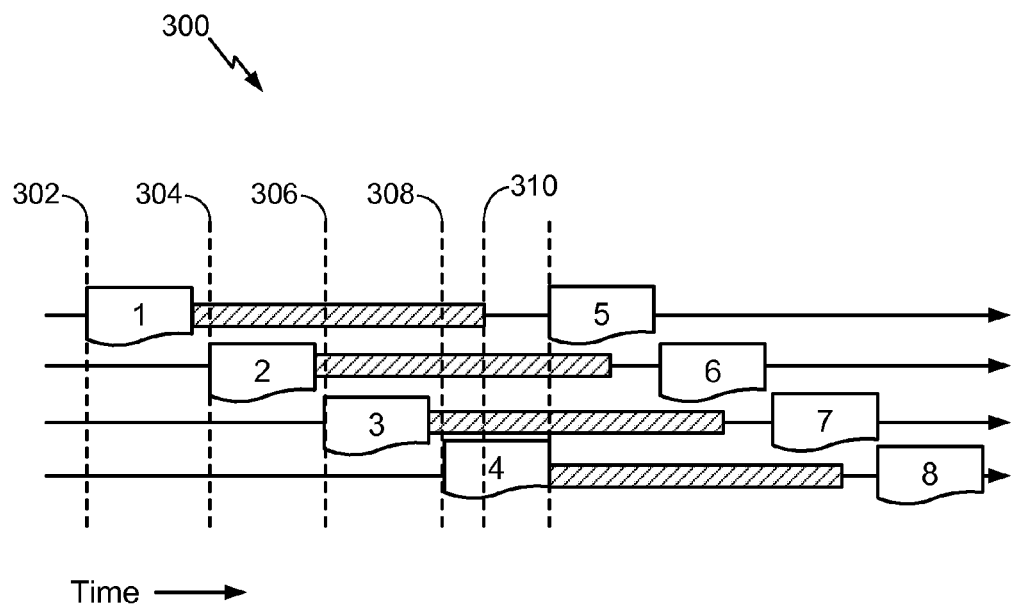
FIG. 3 is a timing diagram illustrating multithread processing of time sequenced data frames.
Figure 4:
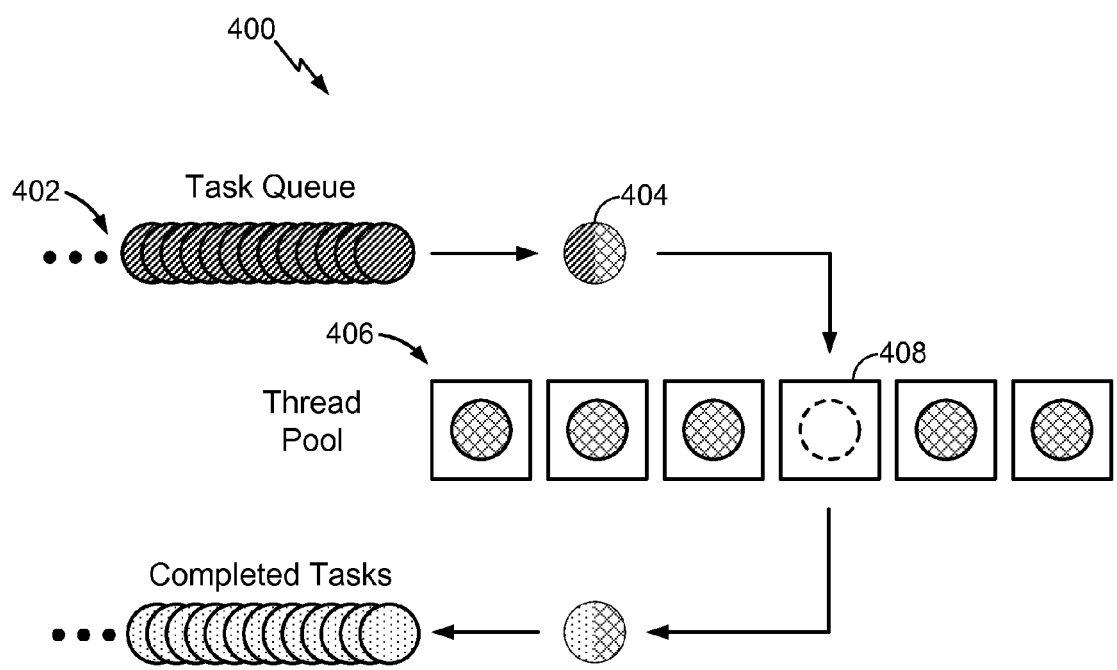
FIG. 4 is a diagram illustrating queuing of tasks to facilitate the multithread processing of FIG. 3.

FIG. 3 is a timing diagram 300 illustrating multithread processing of time sequenced data frames, and FIG. 4 is a diagram 400 illustrating queuing of tasks to facilitate the multithread processing of FIG. 3. In FIG. 3, a first data frame (e.g., a first frame of image data of a video stream) begins execution at a time 302. The first data frame may be processed at a set of hardware resources of a computing device, such as at the hardware resources 116 of FIG. 1. Particular hardware resources that are used to execute particular operations on the first data frame are scheduled by a scheduler, such as the scheduler 114 of FIG. 1, to enable efficient execution of a program. For example, the hardware resources may be allocated (or scheduled) based on paths to traverse from a source node to a sink node in a graph representing the program. To illustrate, the scheduler 114 may arrange tasks associated with the nodes in a task queue, such as a task queue 402 of FIG. 4.

As hardware resources become available (e.g., when a thread 408 of thread pool 406 has an opening), a second data frame (e.g., a second frame of image data of the video stream corresponding to a task 404 from the task queue 402) may begin execution at a time 304. The second data frame may begin execution before execution of the first data frame is completed (e.g., before a time 310). Similarly, as other hardware resources become available during execution of the first data frame and/or the second data frame, a third data frame (e.g., a third frame of image data of the video stream) may begin execution, at a time 306. The third data frame may begin execution prior to completion of execution of the first data frame, prior to completion of execution of the second data frame, or both. Likewise, as other hardware resources become available other data frames, such as a fourth data frame may begin execution (e.g., at a time 308). Thus, multiple data frames may be processed concurrently to efficiently utilize available hardware resources.

Thus, referring to FIG. 2, the first data frame may be provided as first input data to the source node N1 at the time 302 of FIG. 3. The first data frame may be processed according to the program illustrated by the nodes N1-N7 of FIG. 2 until a first output data frame is generated by the sink node N7 (at the time 310 of FIG. 3). The second data frame (and possibly the third data frame or one or more subsequent data frames) may be provided to the source node N1 as input data after the time 302 of FIG. 3 and before the time 310 of FIG. 3. Thus, throughput of the program may be improved by efficient execution of the program at the available hardware resources.

Figure 5:
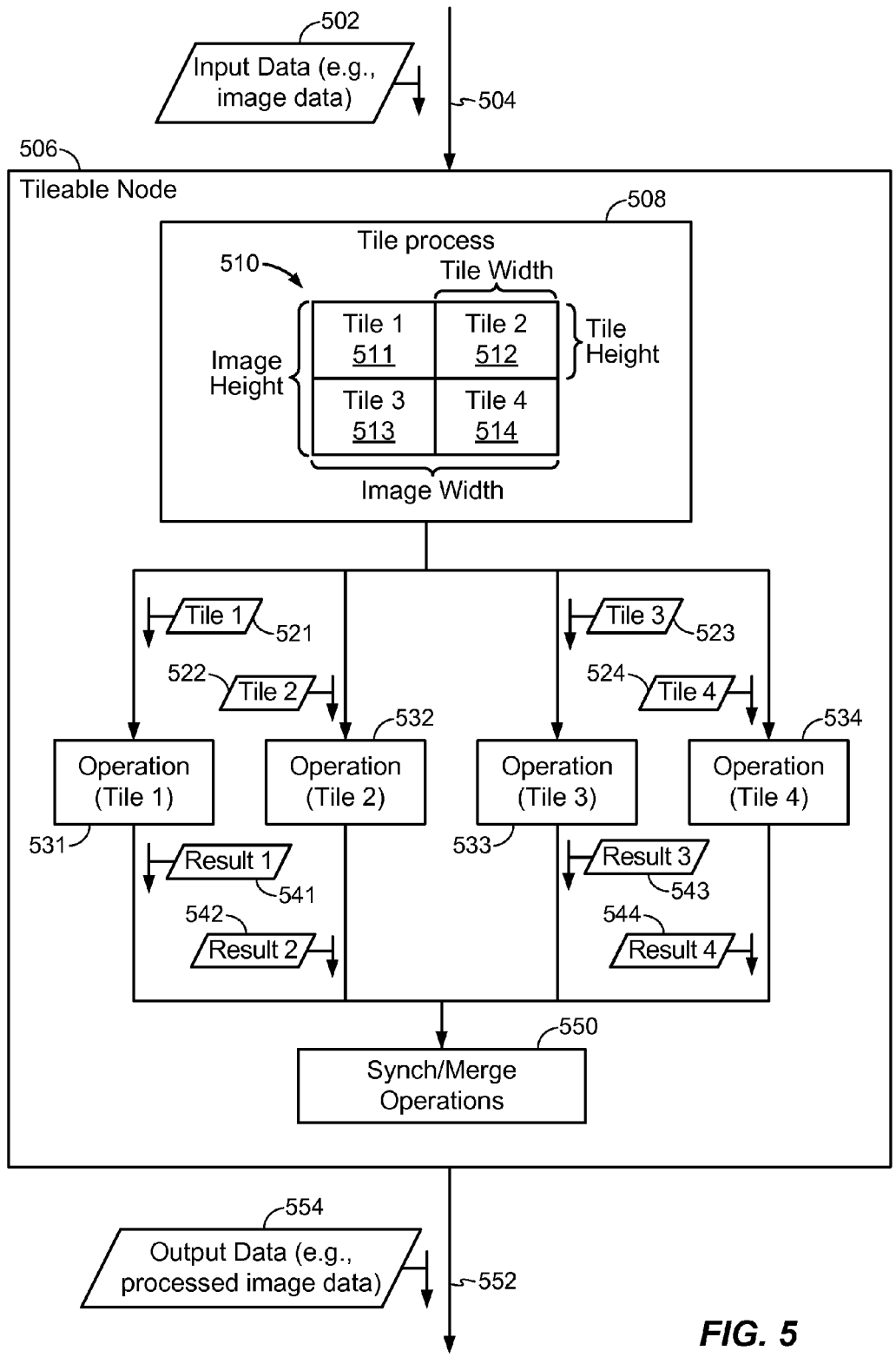
FIG. 5 illustrates a particular embodiment of execution of a tileable node.

FIG. 5 illustrates a particular embodiment of execution of a tileable node 506. A tileable node refers to a node that is associated with a function or operation that can be divided. For example, when a tileable node performs an operation on a dataset, the operation may be implemented by dividing the dataset into multiple subsets, implementing the operation on each subset to generate a subset result, and merging the subset results to form an operation result. The tileable node 506 may correspond to one of the nodes N1-N7 of FIG. 2.

The tileable node 506 may receive input data 502, such as image data, from a prior node of a program via an edge 504. Alternatively, the tileable node 506 may be a source node and may receive the input data 502 from a source other than another node of the program (e.g., from the memory 132 of FIG. 1). The input data 502 may correspond to an image 510 having a resolution corresponding to an image height and an image width.

The tileable node 506, a graphical programming engine (such as the graphical programming engine 110 of FIG. 1), or a scheduler (such as the scheduler 114 of FIG. 1) may implement a tile process 508. The tile process 508 may subdivide the image 510 into multiple tiles, such as a first tile 511, a second tile 512, a third tile 513, and a fourth tile 514. Each tile may have a tile width and a tile height. The tile width may be less than the image width, and the tile height may be less than the image height. Although FIG. 5 illustrates each tile having the same size, in particular embodiments, one or more of the tiles 511-514 may have a smaller or larger size than other tiles.

Tile data 521-524 associated with each of the tiles 511-514 may be provided to a node operation. For example, first tile data 521 corresponding to the first tile 511 may be provided to a first node operation, second tile data 522 associated with the second tile 512 may be provided to a second node operation 532, third tile data 523 associated with the third tile 513 may be provided to a third node operation 533, and fourth tile data 524 associated with the fourth tile 514 may be provided to a fourth node operation 534. Each operation 531-534 may perform functions of the tileable node 506 to generate results. For example, each of the operations 531-534 may correspond to an instance of the tileable node 506. The operations 531-534 may be executed at different hardware resources. For example, each of the operations may be executed at a different core of a CPU or GPU. In another example, the operations may be formed at diverse hardware resources. For example, the first operation 531 may be performed at a CPU, the second operation may be performed at a GPU, the third operation 533 may be performed at a DSP, and the fourth operation 534 may be formed at a RICA processor. Although four tiles 511-514 and four operations 531-534 are shown in FIG. 5, the tile process 508 may divide the image 510 into more than four tiles or fewer than four tiles. Accordingly, the number of operations 531-534 may be more than four or fewer than four.

Each of the operation 531-534 may generate result data corresponding to performance of the operation on particular tile data. For example, the first operation 531 may generate a first result 541 based on the first tile data 521, the second operation 532 may generate a second result 542 based on the second tile data 522, the third operation 533 may generate a third result 543 based on the third tile data 523, and the fourth operation 534 may generate a fourth result 544 based on the fourth tile data 524. A synchronization or merging operation 550 may combine the results 541-544 to generate output data 554. The combined results may correspond to or approximate performing an operation corresponding to the operations 531-534 on the image 510 as a whole.

To illustrate, the tileable node 506 may be a blur image node executable to blur an image corresponding to the input data 502. The tile process 508 may divide the image 510 into multiple tiles 511-514, which are each blurred individually and merged, via the synchronization or merging operation 550, to generate the output data 554. The output data 554 may be provided to another node via an edge 552. Alternately, if the tileable node 506 is a sink node, the output data 554 may be stored to a memory or other output device rather than provided to another node. Thus, execution of a particular node may be subdivided among hardware resources by splitting data to be processed by the tileable node 506 and executing operations corresponding to operation of the tileable node 506 on multiple subsets of the data.

Figure 6:
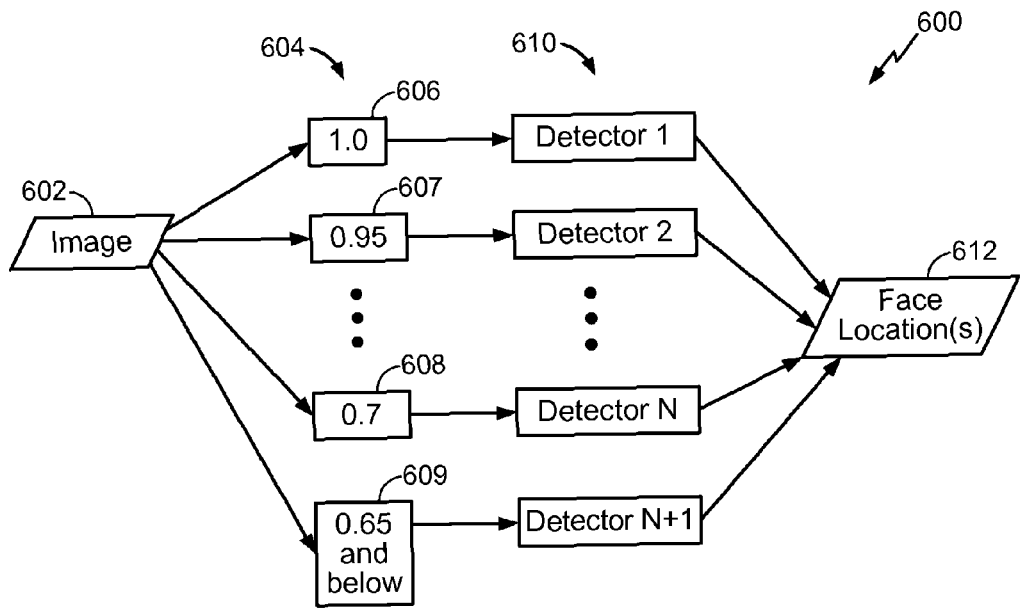
FIGS. 6-8 are diagrams illustrating a particular embodiment of tiling in the context of face detection.
Figure 7:
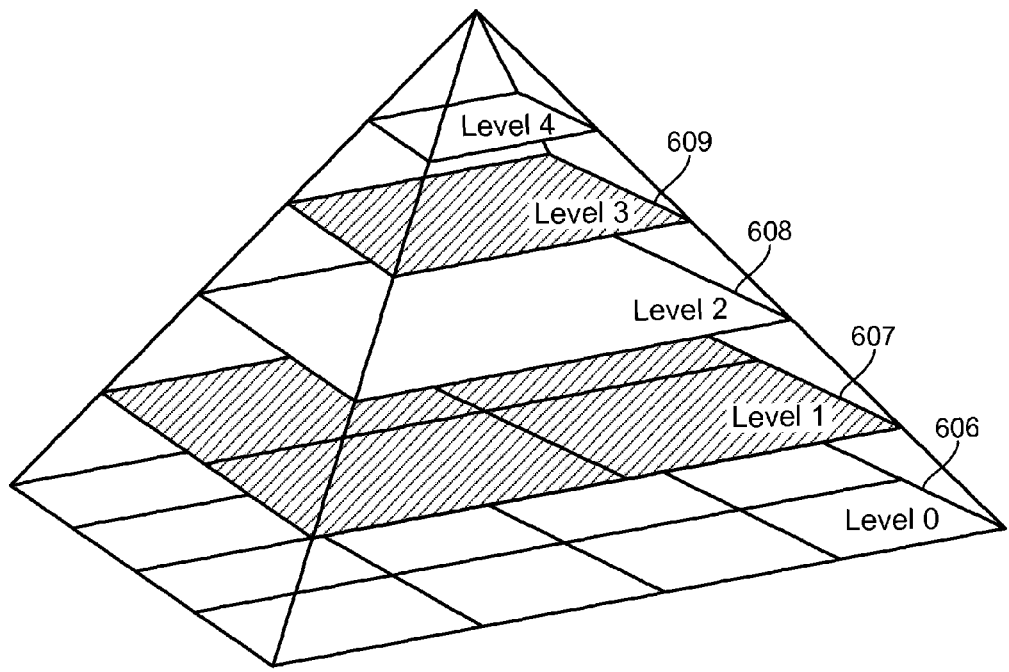
Figure 8:
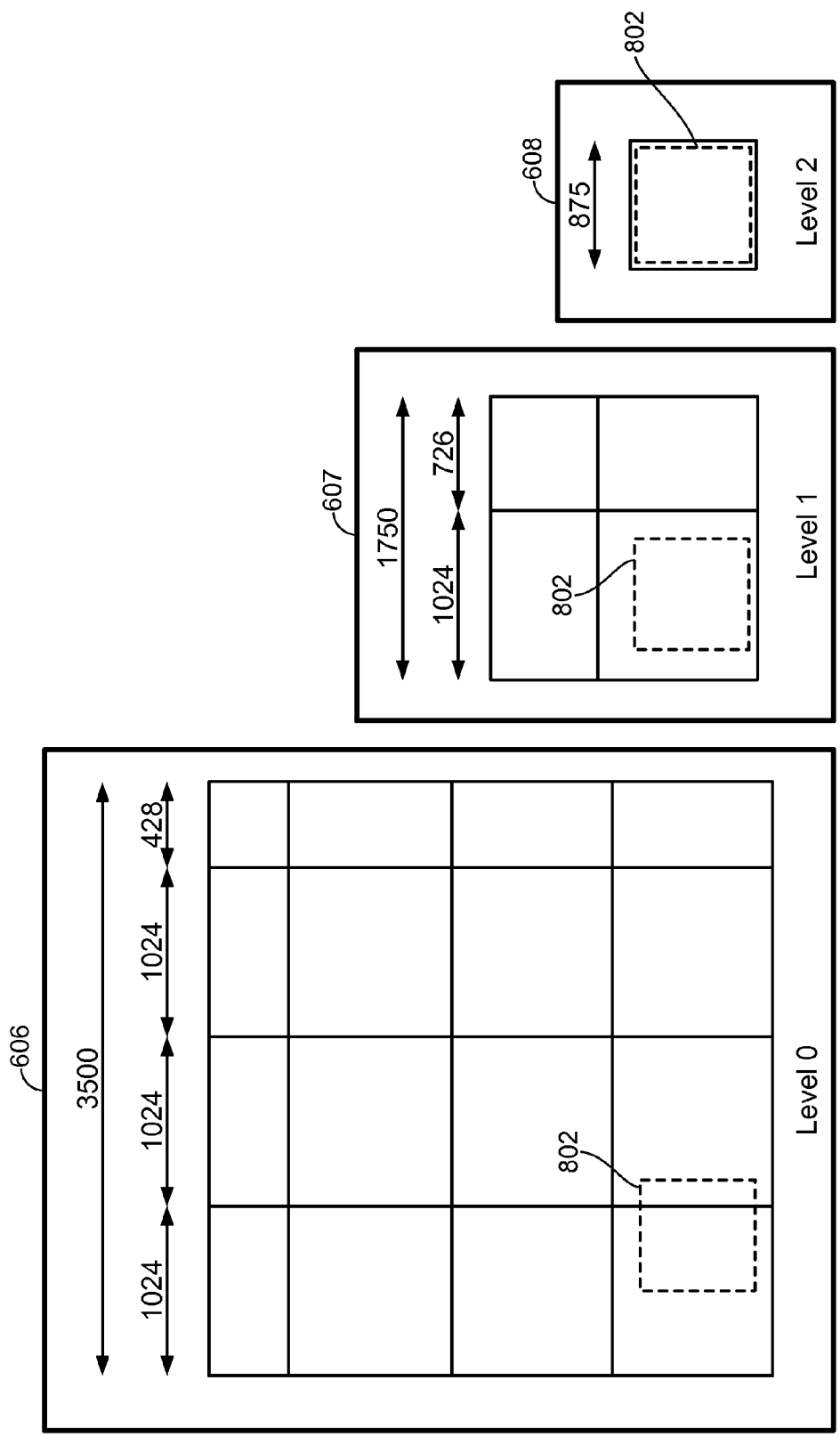

FIGS. 6-8 are diagrams illustrating a particular embodiment of tiling in the context of face detection. In particular, FIG. 6 illustrates processing copies 604 of image data 602 at a plurality of detector operations 610 to generate face location data 612. FIG. 7 illustrates an example of a relationship between the copies 604 of the image data 602 of FIG. 6. FIG. 8 illustrates an example of searching within the copies 604 of the image data 602 of FIG. 6 using a search grid 802.

In FIG. 6, the system 600 may receive the image data 602 corresponding to an image to be processed using a face detection process. For example, the face detection process may correspond to a node of the program illustrated in FIG. 2. The face detection process may be tileable. For example, as described further below, when an image is larger than a search grid used for face detection, portions of the image may be searched separately (e.g., using different hardware resources) to efficiently complete the face detection processing. In another example, as illustrated in FIGS. 6-8, multiple copies of the image may be generated and searched. To illustrate, a first copy 606 of the image data 602 may be generated at 100% (i.e., one times) the resolution of the original image data 602. A second copy 607 of the image data 602 may be generated at a lower resolution (e.g., 95% of the original resolution). Further, one or more additional copies, such as a third copy 608 and a fourth copy 609 may be generated at still lower resolutions. The particular number of discrete copies of image data that are generated may vary from one embodiment to the next embodiment depending on several factors, such as resolution of the image data 602, a size of a search grid 802, and processing constraints.

Each of the copies 606-609 of the image data 602 is provided to a face detector instance, which searches the copy of the image data to detect features of a face and to generate face location data. For example, referring to FIG. 8, a first face detector instance may use the search grid 802 to search a first copy 606 of the image data 602 at full resolution, a second face detector instance may use the search grid 802 to search a second copy 607 of the image data 602 at reduced resolution, and a third face detector instance may use the search grid 802 to search a third copy 608 of the image data 602 at further reduced resolution. Two or more of the face detector instances may be executed by different hardware resources. For example, the first face detector instance may be executed at one or more of the cores 122 of the CPU 120 of FIG. 1, and the third face detector instance may be executed at the DSP 128. In a particular embodiment, copies of the image data 602 that are below a threshold resolution (e.g., below a particular percentage of the original resolution of the image data 602, such as below 65% of the original resolution) may be processed by face detector instances executing at relatively low power processing units, such as the DSP 128 of FIG. 1. Other copies of the image data 602 (e.g., copies of the image data 602 that are not below the threshold resolution) may be processed by face detector instances executing at relatively high power processing units, such as the CPU 120 or the GPU 124.

As illustrated in FIG. 8, the search grid 802 used for each copy of the image data 602 may have the same size regardless of the size of the resolution of the copy. For example, the search grid 802 may have a size of 80 pixels by 80 pixels. Faces that are very large in the original image data 602 may be undetected by the search grid, since portions of such faces may extend beyond boundaries of the search grid. However, such faces may be detected by using the same size search grid 802 in a smaller image (corresponding to a lower resolution copy of the image data 602). Search of the original image data 602 and the lower resolution copies of the image data may be tiled (or distributed) across multiple hardware resources to enable efficient processing. Further, since the search grid may be considerably smaller than the original image data 602, the original image data 602 (or one or more of the lower resolution copies) may be processed in a tiled manner. For example, the original image data 602 may be divided into subsets, with each subset corresponding to a portion of the original image. Each subset may be provided to a corresponding face detector instance to generate face location information.

Since each face detector instance may be executed at a different hardware resource, the entire face detection process may be performed efficiently and in a timely manner since detection of faces at multiple resolutions and/or face detection for multiple portions of a large image may occur concurrently or simultaneously at different hardware resources.

Figure 9:
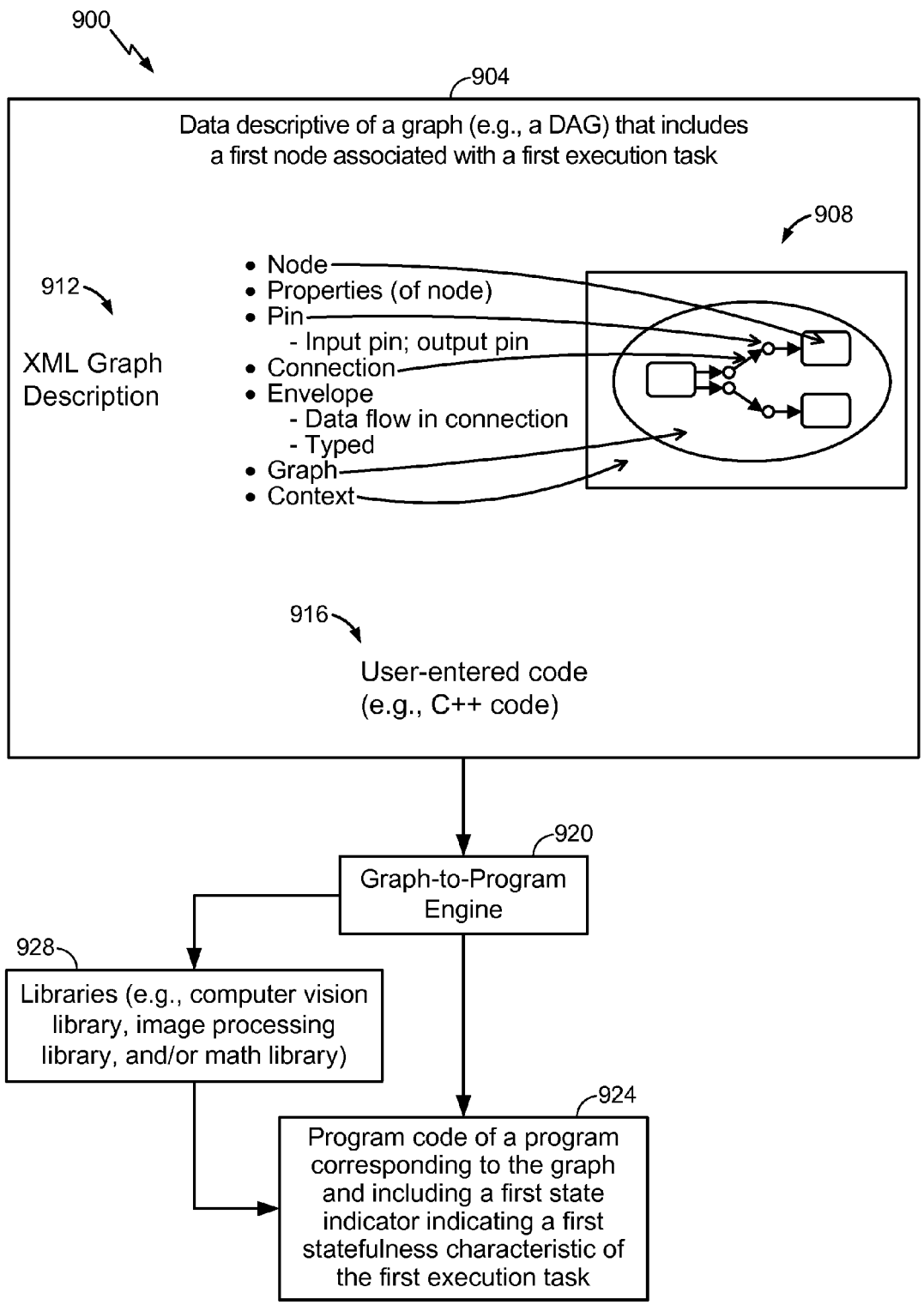
FIG. 9 is a block diagram of a particular illustrative embodiment of a system to generate program code including a first state indicator indicating a first statefulness characteristic of a first execution task corresponding to a first node of a graph.

Referring to FIG. 9, a particular illustrative embodiment of a system is depicted and generally designated 900. The system 900 includes a graph-to-program engine 920 that is responsive to data 904. The data 904 is descriptive of a graph, such as a directed acyclic graph (DAG). The graph-to-program engine 920 may generate program code 924 of a program corresponding to the graph. In addition, the example of FIG. 9 depicts libraries 928 that may be called by the graph-to-program engine 920, the program code 924 (e.g., during execution of the program code 924), or a combination thereof.

The data 904 may be represented according to one or more techniques. Several such techniques are depicted in the system 900 of FIG. 9. For example, the system 900 depicts a graph 908, an extensible mark-up language (XML) graph description 912, and user-entered code 916 (e.g., user-entered C++ code that is descriptive of a graph). The data 904 may be entered by a user at a suitable interface, such as at a graph-building interface executing at a computing device. The data 904 may be generated by parsing a visual representation of the graph 908 (e.g., a representation of the graph 908 entered by a user at a user interface of a computer). It should be appreciated that FIG. 9 is illustrative and that the data 904 may be represented using fewer such techniques, more techniques, and/or other techniques not illustrated in FIG. 9. In particular, although FIG. 9 depicts three such techniques for illustrative purposes, it should be appreciated that the data 904 may be represented using only one such technique.

As generally illustrated in FIG. 9, the graph 908 may include nodes, properties of nodes, an input pin (e.g., a portion of a node that is connected to or that is connectable to other nodes to receive information from other nodes), an output pin (e.g., a portion of a node that is connected to or that is connectable to other nodes to send information to other nodes), a source node, a sink node, a transform node, a node callback, a node property, a connection between nodes, an envelope, a graph context, or a combination thereof. As a particular example, the graph 908 may include a first node representing a first execution task of a program, a second node representing a second execution task of the program, and an edge representing a data transfer step between the first node and the second node. Envelopes are described further below with reference to FIG. 11. In a particular embodiment, the data 904 corresponds to image processing tasks of a computer vision application.

The graph 908 may correspond to a directed acyclic graph (DAG). Alternatively, the graph 908 may correspond to a modified DAG (e.g., a "pseudo-DAG") that includes a delay node. The delay node may include an input pin that accepts a null envelope at a first time and that is initialized as being dispatchable, as described further below. A "delay task" corresponding to the delay node may be executed by incrementing a sequence number of the null envelope and outputting the null envelope from an output pin of the delay node at a second time after the first time (e.g., after a delay). Accordingly, the present disclosure is applicable to various types of graphs, such as DAGs, modified DAGs that include one or more delay nodes, other graphs, or a combination thereof.

The program code 924 may correspond to the data 904. For example, the program code 924 may include code executable to perform execution tasks corresponding to nodes of the graph 908. The execution tasks may include certain computer vision or image processing execution tasks, such as image blurring of a captured image.

In operation, the graph-to-program engine 920 may be responsive to the data 904 to generate the program code 924. The graph-to-program engine 920 may analyze the data 904 for nodes that may be executed in parallel. As an example, and described further with reference to FIG. 10, certain nodes of the graph 908 may be divisible into multiple sub-nodes. The graph-to-program engine 920 may analyze whether such sub-nodes may be safely executed in parallel. In a particular example, the graph-to-program engine 920 analyzes characteristics of a particular hardware platform at which the program code 924 is to be executed. Accordingly, the graph-toprogram engine 920 may insert into the program code 924 a first state indicator indicating a statefulness characteristic of the first execution task corresponding to the first node.

Because the program code 924 includes the first state indicator, performance degradation resulting from inefficient uses of hardware resources can be avoided. For example, as described further with reference to FIG. 10, the first state indicator may prevent certain execution tasks from being performed in parallel when performing the execution tasks in parallel could result in data being overwritten. Further, as explained further below, the graph-to-program engine 920 may be customized for computer vision applications, such as image processing tasks that perform operations on large amounts of data. For example, the envelopes described further with respect to FIG. 11 may facilitate efficient transfer of data between execution tasks corresponding to nodes of a graph, such as the graph 908 of FIG. 9.

Figure 10:
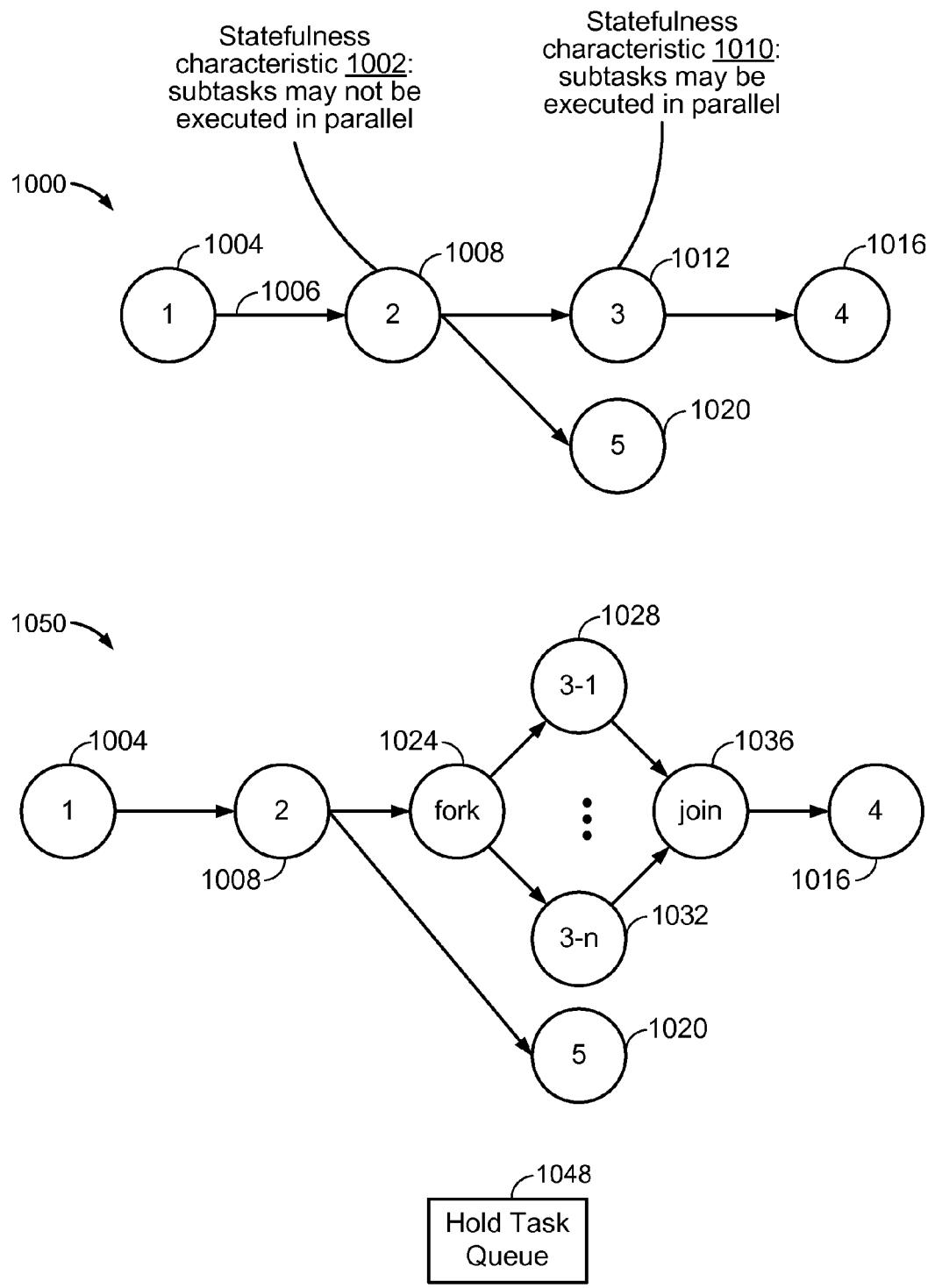
FIG. 10 depicts a particular illustrative application of the statefulness characteristic of FIG. 9.

FIG. 10 depicts a particular illustrative embodiment of a first graph 1000 and a second graph 1050. One or both of the graphs 1000, 1050 may correspond to the graph 908 of FIG. 9. In a particular embodiment, the second graph 1050 illustrates a particular parallel implementation of the first graph 1000, as explained further below.

The first graph 1000 includes a plurality of nodes, such as a first node 1004, a second node 1008, a third node 1012, a fourth node 1016, and a fifth node 1020. The first graph 1000 may include multiple edges representing data transfer steps between the nodes. For example, FIG. 10 illustrates a representative first edge 1006 between the nodes 1004, 1008.

As depicted in FIG. 10, the first graph 1000 may include indications of statefulness characteristics of one or more nodes. As an example, the first graph 1000 may include a first state indicator 1002 indicating that the second node 1008 should not be subdivided into sub-tasks executable in parallel, as illustrated. As another example, the first graph 1000 may include a second state indicator 1010 indicating that the third node 1012 may be subdivided into sub-tasks to be executed in parallel. In a particular embodiment, the graph-to-program engine 920 of FIG. 9 analyzes data corresponding to the first graph 1000 (e.g., the data 904) to determine which of the nodes 1004, 1008, 1012, 1016, 1020 may or may not be executed in parallel. The graph-to-program engine 920 may analyze a particular parallel computing platform to determine which of the nodes 1004, 1008, 1012, 1016, 1020 may be executed in parallel. For example, the graph-to-program engine 920 may analyze a number and type of central processing units (CPUs), digital signal processors (DSPs), graphics processing units (GPUs), field programmable gate array (FPGA) devices, FPGA-like devices, reconfigurable instruction cell array (RICA) devices, other processing devices, or a combination thereof, that are available to execute program code to the first graph 1000. The program code may correspond to the program code 924 of FIG. 9.

As a result, the second graph 1050 may be generated based on the first graph 1000. The second graph 1050 includes sub-nodes 1024, 1028, 1032, 1036 that correspond to the third node 1012 of the first graph 1000. Each of the sub-nodes 1024, 1028, 1032, 1036 may correspond to a respective sub-task. Some of the sub-tasks may be executed in parallel because state data corresponding to the sub-tasks is not maintained or is stored at separate buffers and will not be overwritten during execution of the sub-tasks. As an example, it may be determined that the second node 1008 either is not divisible into sub-tasks or that the second node 1008 is divisible into sub-tasks but data from such sub-tasks is not to be written to a common buffer. In at least one embodiment, if state data for the second node 1008 (e.g., "temporary" results associated with the second execution task) is not maintained after execution of the second execution task, then the second node 1008 is referred to as being "stateless." Accordingly, the first statefulness characteristic may indicate that the second node 1008 should not be divided into sub-tasks that are executed in parallel.

It should be appreciated that the foregoing examples are illustrative and non-limiting. For example, the second state indicator 1010 may indicate that the third node 1012 may not be subdivided into sub-tasks for parallel execution, such as when state data for the sub-nodes 1028, 1036 is stored at a common buffer and therefore could be overwritten during parallel execution of sub-tasks corresponding to the sub-nodes 1028, 1032.

Further, each of the nodes 1004, 1008, 1012, 1016, 1020 may be associated with a respective execution task. The execution tasks may include image processing tasks corresponding to a computer vision application, such as facial recognition, image blurring, shape recognition, text recognition, image cropping, image resolution adjustment, other execution tasks, or a combination thereof. Further, as described above with reference to FIG. 9, the execution tasks may include a "delay" task associated with a delay node.

FIG. 10 further depicts a hold task queue 1048. The hold task queue 1048 may be configured to hold tasks (e.g., buffer tasks) corresponding to nodes, such as any of the nodes depicted in FIG. 10. In a particular embodiment, the hold task queue 1048 buffers tasks until such tasks are ready to be dispatched. For example, because execution of the sub-node 1036 may require results of each of the nodes 1028, 1032, unfinished tasks corresponding to the nodes 1028, 1032 may be buffered at the hold task queue 1048 until each such task is dispatchable. In at least one embodiment, such tasks are buffered at the hold task queue 1048 based on unresolved dependencies associated with such tasks. That is, if execution of a particular task is dependent upon the result of an earlier task, the particular task may be buffered at the hold task queue 1048 until such dependencies are resolved (e.g., until the task becomes dispatchable). The number of dependencies of a node may correspond to a "sequence number" associated with the node. The sequence number may be initialized to correspond to the number of input pins of the node (e.g., the number of other nodes from which the node receives information). An execution task of a node may be executed automatically in response to the execution task becoming dispatchable if the statefulness characteristic of the node indicates that the first execution task is stateless.

Accordingly, the techniques described with reference to FIG. 10 may enable improved performance of execution of program code, such as by avoiding overwriting of data when particular tasks are executed in parallel. For example, although a particular processing task may be implementable as sub-tasks executed in parallel at a parallel computing platform, the statefulness characteristics of FIG. 10 may indicate that such sub-tasks should not be executed in parallel, such as when executing the sub-tasks in parallel could cause one of the sub-tasks to overwrite data of another of the sub-tasks (e.g., when the sub-tasks write to a common buffer).

Although FIG. 10 depicts that the state indicators 1002, 1010 are specified at the "graph-level" (e.g., by the first graph 1000, as shown), it should be appreciated that state indicators may be inserted at the program code-level. For example, in a particular embodiment, the graph-to-program engine 920 of FIG. 9 may analyze graph data corresponding to the first graph 1000 to determine the state indicators 1002, 1010. The graph-to-program engine 920 may insert the state indicators 1002, 1010, other state indicators, or a combination thereof, in the program code 924.

Figure 11:
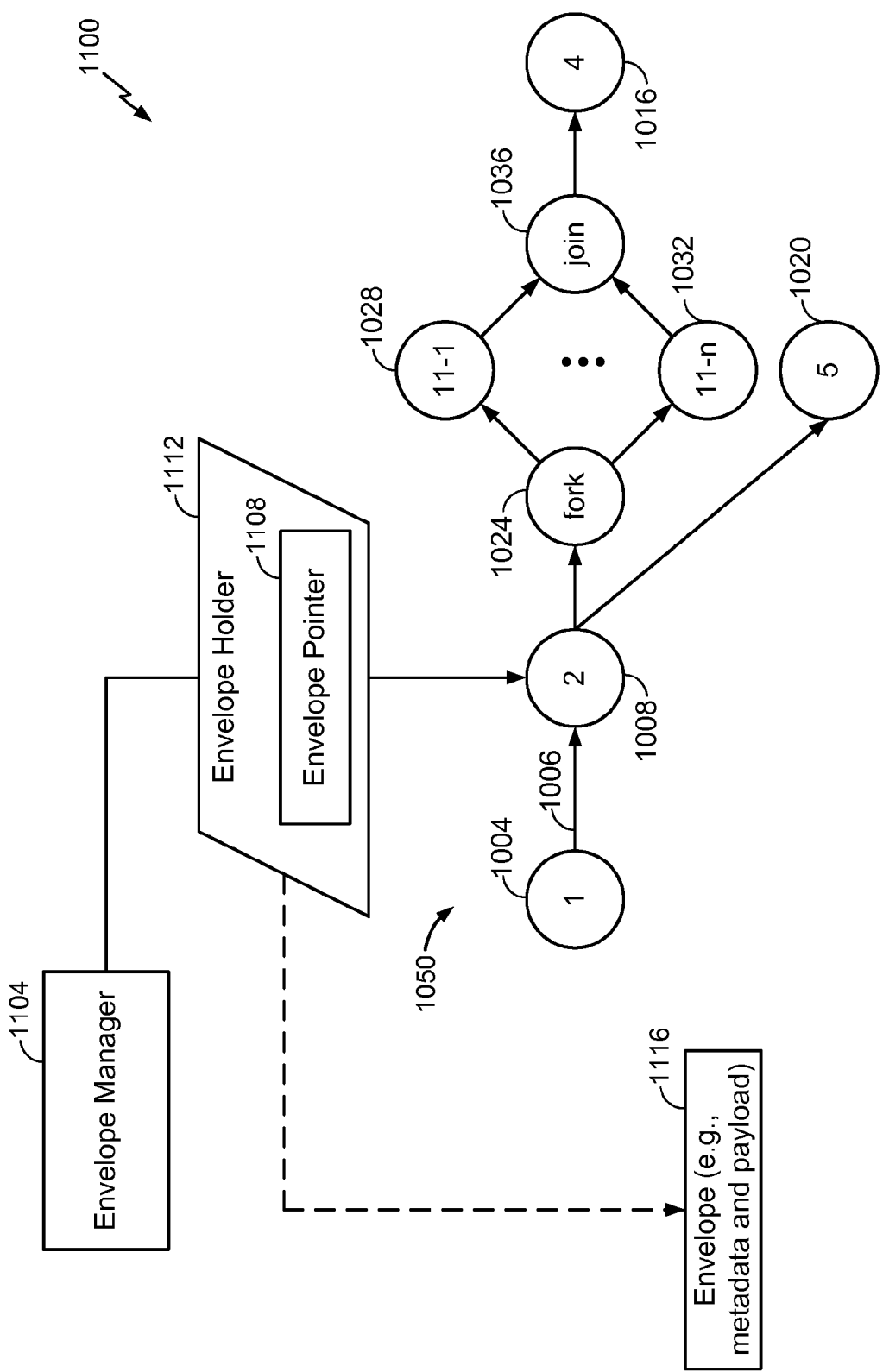
FIG. 11 depicts a particular illustrative embodiment of a system that includes an envelope manager.

Referring to FIG. 11, a particular illustrative embodiment of operation of a system is depicted and generally designated 1100. In the particular example of FIG. 11, an envelope manager 1104 distributes envelopes to a requesting node of a graph, such as the second graph 1050, as illustrated. In FIG. 11, the requesting node corresponds to the second node 1008. The envelope manager 1104 may be integrated within the graph-to-program engine 920 of FIG. 9. As used herein, "envelope" may refer to data (e.g., a collection, a set or package of data, or a location of the data) specified by one or more execution tasks associated with nodes of a graph.

In operation, an envelope pointer 1108 may be passed between nodes of the second graph 1050. For example, in at least one embodiment, instead of passing envelopes (e.g., data) between nodes of the second graph 1050, the envelope manager allocates access to an envelope 1116 between nodes of the second graph 1050. That is, the envelope pointer 1108 may be passed between the nodes instead of passing data that corresponds to the envelope 1116. The envelope pointer 1108 may point to a memory location at which the envelope 1116 is stored. Allocating access to the envelope 1116 may include temporarily distributing the envelope pointer 1108 to the requesting node while the envelope manager 1104 retains ownership of the envelope 1116.

The envelope pointer 1108 may be "wrapped" in an envelope holder 1112, as illustrated. For example, the envelope holder 1112 may be a lightweight object that automates acquisition and release of the envelope pointer 1108 by nodes of the second graph 1050. That is, the envelope holder 1112 may be passed between nodes of the second graph 1050 instead of passing the envelope 1116, which may contain a large amount of data (e.g., when the envelope contains image data, such as frames of a video sequence). After the requesting node releases the envelope pointer 1108, the envelope manager 1104 may reclaim the envelope pointer 1108. The envelope holder 1112 may be specified at the "graph-level" (e.g., the second graph 1050 may specify the envelope holder 1112, which may make the envelope holder 1112 accessible to users). The envelope holder 1112 may specify a direction or "flow" of the envelope holder 1112 (e.g., that the envelope holder 1112 can pass from the second node 1008 to the fifth node 1020).

The envelope 1116 may include a payload (e.g., results of execution tasks, such as results of the second execution task) and metadata (e.g., an indication of which node currently "owns" the envelope 1116). After the requesting node utilizes the envelope 1116 (e.g., performs a task to generate a result that is written to the payload of the envelope 1116), the payload may be passed to subsequent (e.g., "downstream") nodes via the envelope pointer 1108 if any such subsequent nodes are to use the payload. Alternatively, if a subsequent node is not to use the payload, the requesting node may request a second envelope and write results of the second execution task to the second envelope. The metadata may include an envelope type indication of the envelope 1116, a transport type indication, a timestamp, a transport flag indicating which node currently "owns" the envelope 1116, or a combination thereof. The requesting node may include an input pin that buffers the envelope pointer 1108 in response to receiving the envelope pointer 1108 from the envelope manager 1104. Alternatively or in addition, the system 1100 may further include an input envelope queue configured to buffer the envelope pointer 1108 (and possibly one or more additional envelope pointers) while the requesting node completes a corresponding execution task.

The transport flag may further indicate whether the envelope pointer 1108 is associated with read-only access or read and write access. For example, if multiple parallel nodes (e.g., the sub-nodes 1028, 1032) obtain the envelope pointer 1108, the transport flag may be set to indicate read-only access to prevent the parallel nodes from overwriting data. Other nodes, such as the second node 1008, may be associated with read and write access. In a particular illustrative embodiment, the envelope manager 1104 automatically sets the transport flag to indicate read-only access in response to determining that an output pin of a requesting node is connected to multiple input pins (which may indicate that the requesting node has multiple "upstream" dependencies). For example, FIG. 11 indicates that an output node of the second node 1008 may be coupled to an input pin of the sub-node 1024 and to an input node of the fifth node 1020.

In at least one embodiment, in response to obtaining access to the envelope pointer 1108 by the requesting node, a reference count is incremented. In response to the requesting node releasing the envelope pointer 1108 (e.g., after execution of the second execution task corresponding to the second node 1008), the reference count is decremented. Further, in response to the requesting node receiving the envelope pointer 1108, a "hold node task" may be added to the hold task queue 1048 of FIG. 10. In response to adding the hold node task to the hold task queue 1048, an execution task corresponding to the requesting node may be dispatched. After completing execution of the execution task, the envelope pointer 1108 may be added to an input envelope queue, a second hold node task may be added to the hold task queue, and a dependency count associated with the second hold node task may be decremented. Accordingly, the dependency count may indicate a number of unresolved dependencies associated with an execution task. When the dependency count is zero, the execution task may be dispatchable, since for example a dependency count of zero may indicate that all "upstream" dependencies have been resolved.

Because the envelope manager 1104 distributes the envelope pointer 1108, transfer of large amounts of data between nodes may be avoided (e.g., in image processing applications that utilize large frames of data representing multiple megapixels). For example, the envelope pointer 1108 may point to a location of the envelope 1116. Therefore, generation of program code corresponding to the second graph 1050 may be simplified, enabling improved performance for applications operating on large amounts of data, such as computer vision applications.

Figure 12:
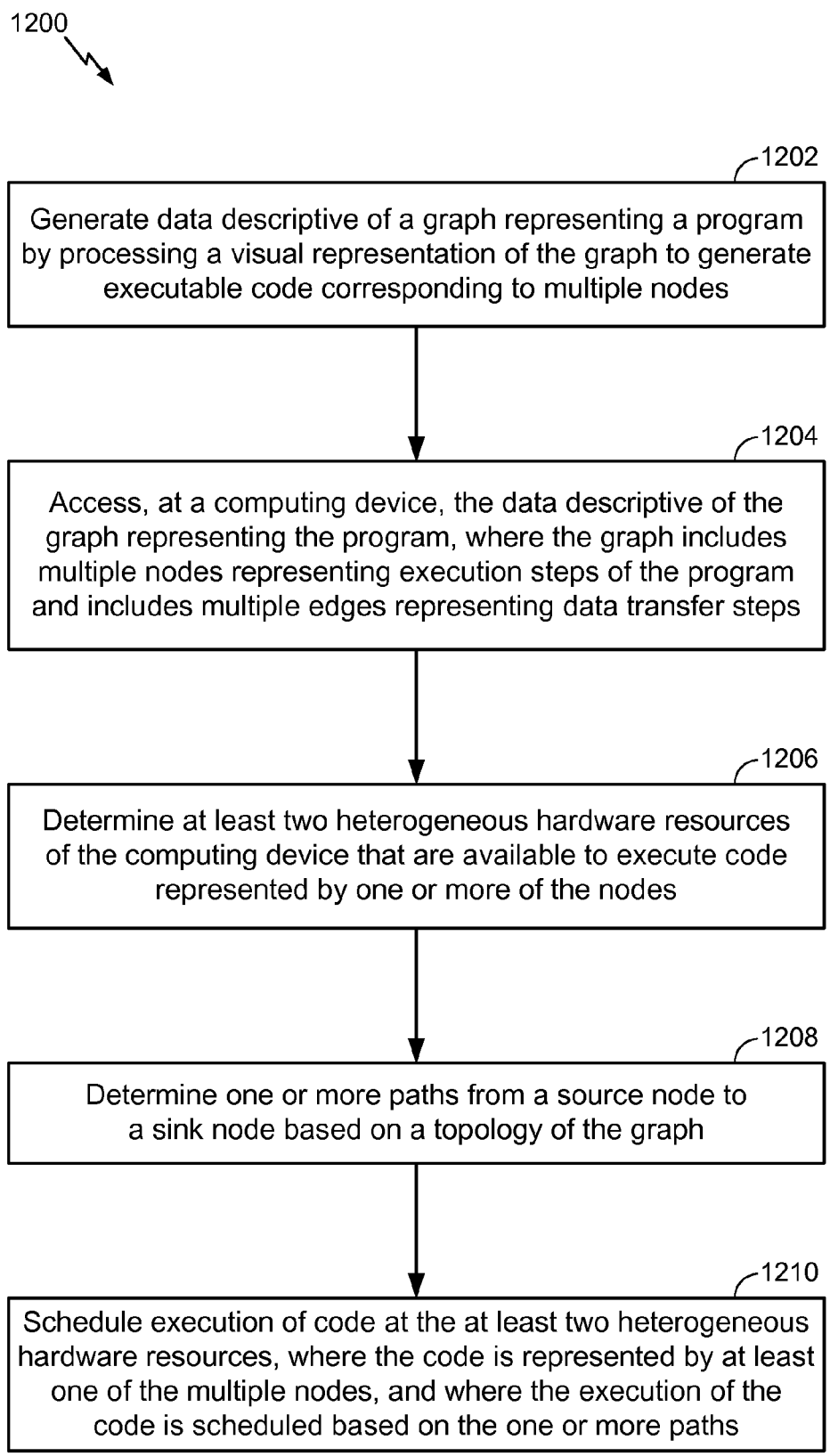
FIG. 12 is a flow chart illustrating a particular embodiment of a method of scheduling a program for efficient execution at available hardware resources.

FIG. 12 is a flow chart illustrating a particular embodiment of a method 1200 of scheduling of a program for efficient execution at available hardware resources. For example, the method 1200 may be performed by the graphical programming engine 110 of FIG. 1, the scheduler 114 of FIG. 1, or the graphical programming engine 110 and the scheduler 114 working together to schedule execution of a program corresponding to the data 108 at the one or more hardware resources 116. The program may correspond to one or more executable nodes as illustrated in FIG. 2.

In a particular embodiment, the method 1200 may include, at 1202, generating data descriptive of a graph representing the program by processing a visual representation of the graph to generate executable code corresponding to multiple nodes. For example, referring to FIG. 1, user input received via a computer vision application, a graphical programming application, or a text editor may be processed to generate the visual representation of the graph.

The method 1200 may also include, at 1204, accessing, at a computing device, the data descriptive of the graph representing the program. As explained above, the graph may include multiple nodes representing execution steps of the program (such as the nodes N1-N7 of FIG. 2) and may include multiple edges representing data transfer steps between the nodes (such as the edges E1-E7 of FIG. 2). The nodes and edges may be defined by the data descriptive of the graph via a visual representation (e.g., a graphics file or image file), via a programming language (e.g., C++), via a markup language (e.g., XML), or using another format.

The method 1200 may also include, at 1206, determining at least two heterogeneous hardware resources of the computing device that are available to execute the one or more nodes. For example, the scheduler 114 or the graphical programming engine 110 of FIG. 1 may determine which hardware resources of the hardware resources 116 are available to execute the program. In a particular embodiment, the method 1200 may also include receiving context information indicating what hardware resources are present at the computing device. The at least two heterogeneous hardware resources may be "mutually heterogeneous" and of different types. Particular examples of types of hardware resources include a central processing unit (CPU) type, a digital signal processor (DSP) type, a graphics processing unit (GPU) type, a field programmable gate array (FPGA) type, and a reconfigurable instruction cell array (RICA) type.

The method 1200 may include, at 1208, determining one or more paths from a source node to a sink node based on topology of the graph. For example, one or more paths (such as the first path 202, the second path 204, and the third path 206 of FIG. 2) may be identified between the source node (e.g., the node N1 of FIG. 2) and the sink node (e.g., the node N7 of FIG. 2). The graphical programming engine 110 or the scheduler 114 may examine or analyze a sequence of execution steps of the graph to identify the paths.

The method 1200 may also include, at 1210, scheduling execution of code at the at least two heterogeneous hardware resources. The code is represented by at least one of the multiple nodes, and the execution of the code is scheduled based on the one or more paths. For example, a first node of the multiple nodes may be scheduled to execute at a processing resource having a first processing resource type, and a second node of the multiple nodes may be scheduled to execute at a second processing resource having a second processing resource type. Particular examples of types of processing resource types include a CPU type, a DSP type, a GPU type, an FPGA type, and a RICA type. The at least two heterogeneous hardware resources may include a first hardware resource having a first hardware type and may further include a second hardware resource having a second hardware type that is different than the first hardware type.

Figure 13:
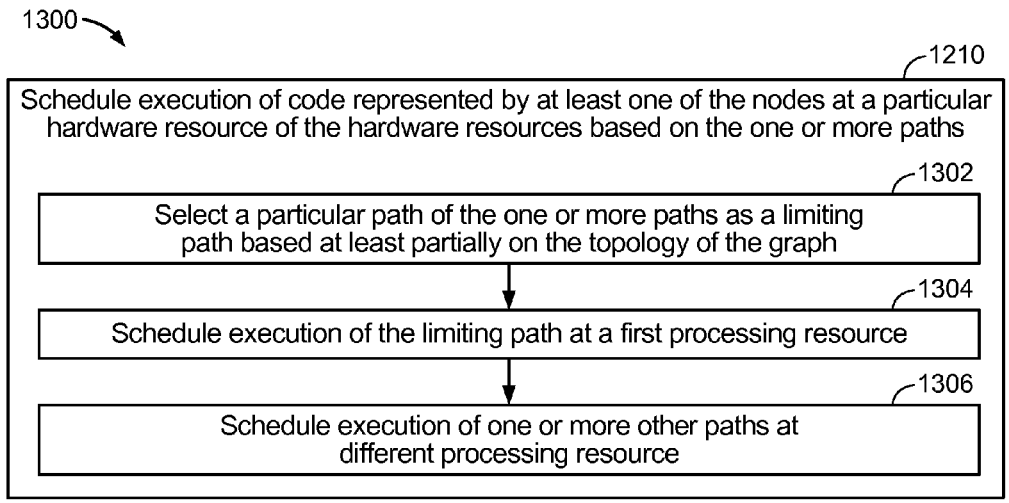
FIG. 13 is a flow chart illustrating a first particular embodiment of a method of scheduling execution of nodes at hardware resources based on paths from a source node to a sink node.

FIG. 13 is a flow chart illustrating a first particular embodiment of a method 1300 of scheduling execution of nodes at hardware resources based on paths from a source node to a sink node, as at 1210 of FIG. 12. The method 1300 may include, at 1302, selecting a particular path of one or more paths from the source node to the sink node as a limiting path. The limiting path may be selected based at least partially on the topology of the graph. For example, as described with reference to FIG. 2, paths 202, 204 and 206 from the source node N1 to the sink node N7 may be identified, and a path associated with a largest cost for execution may be identified as the limiting path. The method 1300 may include, at 1304, scheduling execution of the limiting path at a first processing resource and, at 1306, scheduling execution of one or more other paths at different processing resources. For example, referring to FIG. 2, if the first path 202 is identified as the limiting path, then the nodes N1, N2, N4, N6 and N7 may be scheduled for execution at a particular hardware resource, and the nodes N3 and N5 may be scheduled for execution at one or more other hardware resources.

Figure 14:
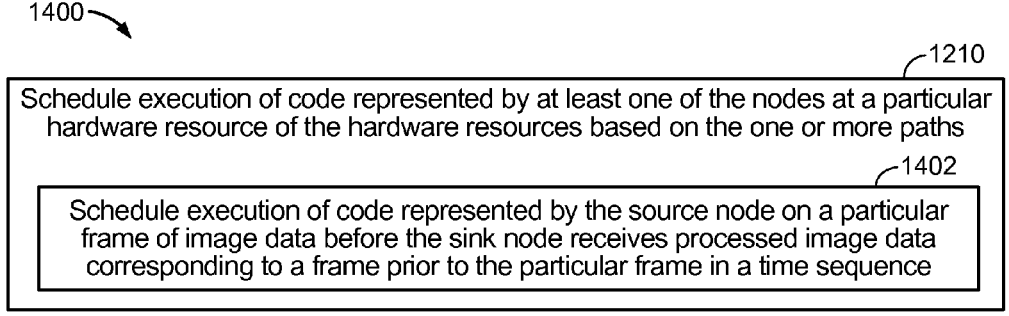
FIG. 14 is a flow chart illustrating a second particular embodiment of a method of scheduling execution of nodes at hardware resources based on paths from a source node to a sink node.

FIG. 14 is a flow chart illustrating a second particular embodiment of a method 1400 of scheduling execution of nodes at hardware resources based on paths from a source node to a sink node, as at 1210 of FIG. 12. In the method 1400, the program operates on a plurality of time sequenced image frames, such as a video stream. The method 1400 includes, at 1402, scheduling execution of a source node on a particular frame of image data before a sink node receives processed image data corresponding to a frame prior to the particular frame in the time sequence. For example, as described with reference to FIG. 3, execution of a second data frame may begin at the time 304, which is before execution of a first data frame is finished at the time 310. Accordingly, at least the first and second frame of image data may be processed concurrently.

Figure 15:
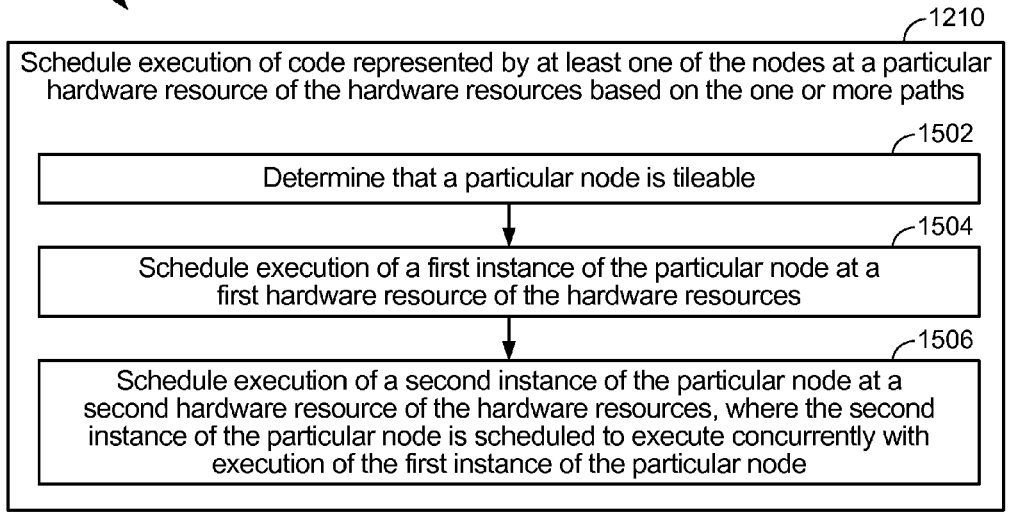
FIG. 15 is a flow chart illustrating a third particular embodiment of a method of scheduling execution of nodes at hardware resources based on paths from a source node to a sink node.

FIG. 15 is a flow chart illustrating a third particular embodiment of a method 1500 of scheduling execution of nodes at hardware resources based on paths from a source node to a sink node, as at 1210 of FIG. 12. The method 1500 includes, at 1502, determining that a particular node is tileable. For example, a node may be determined to be tileable when the node can be implemented as multiple instances with each instance operating on a different subset of a data set provided to the node and where node results can be generated by combining results of the multiple instances.

The method 1500 may also include, at 1504, scheduling execution of a first instance of the particular node at a first hardware resource of a set of available hardware resources, and, at 1506, scheduling execution of a second instance of the particular node at a second hardware resource of the hardware resources. For example, a first instance of the node may be scheduled for execution at the CPU 120 of FIG. 1, and the second instance of the node may be scheduled for execution at the GPU 124 FIG. 1. The second instance may be scheduled to execute concurrently or simultaneously with the execution of the first instance of the particular node. Accordingly, different instances of the tileable node may be executed concurrently or simultaneously in order to expedite determination of node results, as described with reference to FIG. 5.

Although the methods 1300, 1400, and 1500 of FIGS. 13, 14, and 15 have been described separately, in particular embodiments two or more of these methods 1300, 1400, and 1500 may be performed together. To illustrate, after selection of a limiting path in the method 1300, the method 1500 may be performed to determine whether one or more nodes on the limiting path or one or more nodes that are not on the limiting path is tileable. Tileable nodes may be executed as one or more instances, as in the method 1500 of FIG. 15. Similarly, as hardware resources become available during execution of the limiting path or a non-limiting path, such available hardware resources may be allocated for execution of other image frames, according to the method 1400 of FIG. 14. Thus, execution of nodes at hardware resources may be scheduled in a manner that reduces overall cost of execution of the program, where the cost may be determined in terms of time, power, latency, and/or one or more other factors.

Referring to FIG. 16, a flow chart of a particular illustrative embodiment of a method of generating, for a particular parallel hardware configuration, a program based on a graph associated with a computer vision application is depicted and generally designated 1600. The method 1600 includes accessing data (e.g., the data 904 of FIG. 9) descriptive of a graph, at 1604. The graph includes a first node representing a first execution task of a program, a second node representing a second execution task of the program, and an edge representing a data transfer step between the first node and the second node. The graph may correspond to the graph 908 of FIG. 9, the first graph 1000 of FIG. 10, the second graph 1050 of FIGS. 11 and 12, or a combination thereof.

The method 1600 further includes generating, based on the data, program code of the program, at 1608. The program code includes a first state indicator associated with the first node and indicating a first statefulness characteristic of the first execution task. The first state indicator may correspond to one or more of the state indicators 1002, 1010 described with reference to FIG. 10. The program code may be generated by the graph-to-program engine 920 of FIG. 9. The graph-to-program engine 920 may analyze a particular parallel computing platform, such as a platform that has a number of central processing units (CPUs), digital signal processors (DSPs), graphics processing units (GPUs), reconfigurable instruction cell array (RICA) devices, or a combination thereof, to determine which (if any) tasks associated with nodes of the graph may be divided into sub-tasks for parallel execution.

The method 1600 further includes executing the program, at 1612. For example, executing the program may include performing certain image processing tasks, such as image blurring. The program may correspond to a computer vision application.

Because the program code includes the first state indicator, performance degradation resulting from inefficient uses of hardware resources can be avoided (or reduced). For example, the first state indicator may prevent certain execution tasks from being performed in parallel when performing the execution tasks in parallel could result in data being overwritten unintentionally. The program may be generated based on a particular parallel computing platform. One particular example of a computing platform is described with reference to the mobile device depicted in FIG. 17.

Referring to FIG. 17, a block diagram of a particular illustrative embodiment of a mobile device is depicted and generally designated 1700. The mobile device 1700 may include multiple processing resources 1710, such as one or more central processing units (CPUs) 1711, one or more graphical processing units (GPUs) 1713, one or more digital signal processors (DSPs) 1715, other processing resources (such as field-programmable gate arrays (FPGAs), FPGA-like devices, and/or reconfigurable instruction cell array (RICA) devices 1716), or a combination thereof. Additionally, certain of the processing resources 1710 may include more than one processing core. For example, the CPU 1711 may include multiple cores 1712, and the GPU 1713 may include multiple cores 1714. Further, one or more of the processing resources 1710 may be a multithreading processor that is configured to concurrently process multiple threads. The multiple processing resources 1710 may include processing devices (e.g., hardware circuits configured to perform processing operations using an instruction set). Thus, the multiple processing resources 1710 may provide means for executing program instructions.

The processing resources 1710 may be coupled to a computer-readable medium, such as to a memory 1732 (e.g., a non-transitory computer-readable medium). The memory 1732 may store a graphical programming engine 1752, a scheduler 1754, other instructions 1758, data 1756, or a combination thereof. The graphical programming engine 1752 and the scheduler 1754 may correspond to the graphical programming engine 110 and the scheduler 114 of FIG. 1, respectively. Additionally, the processing resources 1710 and the memory 1732 may correspond to the hardware resources 116 of FIG. 1.

For example, the graphical programming engine 1752 and the scheduler 1754 may be executable, by one or more processing units of the processing resources 1710 to accessing data descriptive of a graph representing a program. The graph may include multiple nodes representing execution steps of the program and may include multiple edges representing data transfer steps between the nodes. The graphical programming engine 1752 and the scheduler 1754 may also be executable by one or more processing units of the processing resources 1710 to determine hardware resources of the mobile device 1700 that are available to execute the one or more of the nodes, and to determine one or more paths from a source node to a sink node based on a topology of the graph. The graphical programming engine 1752 and the scheduler 1754 may also be executable, by one or more processing units of the processing resources 1710, to schedule execution of at least one of the nodes at a particular hardware resource (e.g., a processing unit of the processing resources 1710) based on the one or more paths. Alternatively or in addition, the graphical programming engine 1752 may be executable, by one or more processing units of the processing resources 1710, to generate, based on graph data, program code including a node statefulness characteristic indication. Thus, the graphical programming engine 1752, the scheduler 1754, or both may provide scheduling execution of the program instructions at one or more of multiple means for executing program instructions (such as the processing resources 1710).

FIG. 17 also shows a display controller 1726 that is coupled to one or more of the processing resources 1710 and to a display 1728. A coder/decoder (CODEC) 1734 can also be coupled to one or more of the processing resources 1710. A speaker 1736 and a microphone 1738 can be coupled to the CODEC 1734. The mobile device 1700 may include a camera having an image sensor, such as a charge-coupled device (CCD) image sensor or a complementary metal-oxide-semiconductor (CMOS) image sensor. For example, FIG. 17 depicts that a camera 1792 may be coupled to a camera controller 1790. The camera controller 1790 may be coupled to one or more of the processing resources 1710. FIG. 17 also indicates that a wireless controller 1740 can be coupled to one or more of the processing resources 1710. The wireless controller 1740 may be coupled to an antenna 1742 via a radio frequency (RF) interface 1750.

In a particular embodiment, the processing resources 1710, the memory 1732, the display controller 1726, the camera controller 1790, the CODEC 1734, and the wireless controller 1740 are included in a system-in-package or system-on-chip device 1722. An input device 1730 and a power supply 1744 may be coupled to the system-on-chip device 1722. The input device 1730 may be configured to receive input from a user (e.g., data descriptive of a graph representing a program).

In a particular embodiment, as illustrated in FIG. 17, the display 1728, the input device 1730, the camera 1792, the speaker 1736, the microphone 1738, the antenna 1742, the power supply 1744, and the RF interface 1750 are external to the system-on-chip device 1722. However, each of the display 1728, the input device 1730, the camera 1792, the speaker 1736, the microphone 1738, the antenna 1742, the power supply 1744, and the RF interface 1750 can be coupled to a component of the system-on-chip device 1722, such as to an interface or to a controller.

In at least one embodiment, the antenna 1742, the RF interface 1750, and the wireless controller 1740 are configured to interface with a computer. For example, the antenna 1742, the RF interface 1750, and the wireless controller 1740 may be configured to transmit data to a computer. In another embodiment, the mobile device 1700 may be configured to interface with the computer via another interface (not shown), such as a wired interface (e.g., a universal serial bus (USB) interface).

Those of skill in the art will appreciate that the foregoing disclosed devices and functionalities may be designed and configured into computer files (e.g., RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed within devices, such as within the mobile device 1700 of FIG. 17.

Figure 18:
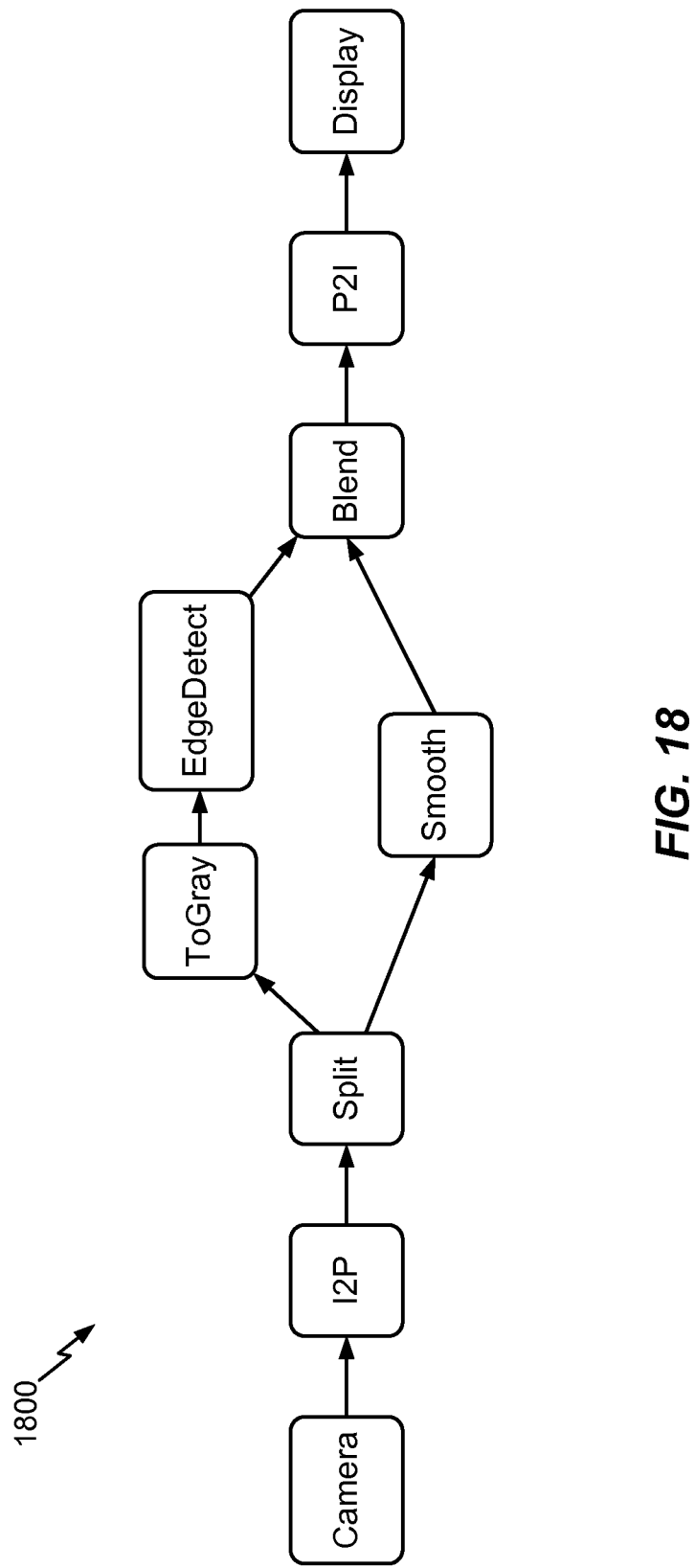

FIGS. 18-21 illustrate various embodiments of data descriptive of a graph representing the program, such as the data 108 of FIG. 1. In FIG. 18, a graph 1800 is represented using visual representations, such as shapes, text and interconnections between shapes). A display of the graph 1800 may be generated based on a file, such as a drawing file or an image file. To illustrate, a graphical editing application may be used to generate the graph 1800 and to data representing the graph 1800 in a file format.

FIG. 19 depicts a particular embodiment of the graph 1800 as represented in a programming language code, such as C++ code. FIG. 20 depicts a particular embodiment of the graph 1800 as represented by a data file that may be load to run the program represented by the data file. FIG. 21 depicts a particular embodiment of the graph 1800 as represented using a markup language, such as XML.

In connection with the disclosed embodiments, an apparatus for generating, for a particular parallel hardware configuration, a program based on a graph associated with an application, includes means for storing (e.g., the memory 1732) data descriptive of a graph. The graph includes a first node representing a first execution task of a program, a second node representing a second execution task of the program, and an edge representing a data transfer between the first node and the second node. The apparatus further includes means for generating (e.g., one or more of the processing resources 1710 executing the graphical programming engine 1752), based on the data, program code of the program. The program code includes a first state indicator associated with the first node and indicates a first statefulness characteristic of the first execution task.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory medium is coupled to the processor such that the processor can read information from, and write information to, the storage medium. In the alternative, the storage medium may be integral to the processor. The processor and the storage medium may reside in an application-specific integrated circuit (ASIC) and/or a field programmable gate array (FPGA) chip. The ASIC and/or FPGA chip may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. As a particular illustrative example, although FIG. 17 has been described with respect to the mobile device 1700, one or more components or operations described herein can be implemented using one or more other electronic devices, such as a desktop computer. Thus, the present disclosure is not intended to be limited to the embodiments shown herein but is to be accorded the widest scope possible consistent with the principles and novel features as defined by the following claims.

What is claimed is:

1. An apparatus for generating, for a particular parallel hardware configuration that includes at least a first particular hardware resource and a second particular hardware resource heterogeneous to the first particular hardware resource, a program based on a graph associated with an application, the apparatus comprising:
    a memory configured to store data descriptive of a graph, the graph including:
        a first node representing a first execution task of a program,
        a second node representing a second execution task of the program, and
        an edge representing a data transfer between the first node and the second node; and
    a processor configured to generate, based on the data, program code of the program, the program code including a first state indicator that is associated with the first node and that indicates whether a first execution of a first instance of the first execution task is scheduled at the first particular hardware resource and whether a second execution of a second instance of the first execution task is scheduled at the second particular hardware resource.

2. The apparatus of claim 1, wherein:
    the first execution task is divisible into at least a first sub-task and a second sub-task, and
    the first state indicator indicates whether the first sub-task and the second sub-task may be executed in parallel.

3. The apparatus of claim 2, wherein state data associated with the first sub-task and the second sub-task is maintained during execution of the first sub-task and the second sub-task, wherein the first state indicator indicates a first statefulness characteristic of the first execution task, and wherein the first statefulness characteristic indicates that the first sub-task and the second sub-task may not be executed in parallel.

4. The apparatus of claim 1, wherein:
the first state indicator indicates a first statefulness characteristic of the first execution task,
the program code further includes a second state indicator that is associated with the second node and that indicates a second statefulness characteristic of the second execution task,
the second statefulness characteristic indicates that the second execution task is stateless, and
the second execution task is not divisible into multiple sub-tasks.

5. The apparatus of claim 1, wherein the processor is configured to determine a cost function based on the first particular hardware resource and the second particular hardware resource.

6. An apparatus for generating, for a particular parallel hardware configuration that includes at least a first particular hardware resource and a second particular hardware resource heterogeneous to the first particular hardware resource, a program based on a graph associated with an application, the apparatus comprising:
means for storing data descriptive of a graph, the graph including:
a first node representing a first execution task of a program,
a second node representing a second execution task of the program, and
an edge representing a data transfer between the first node and the second node; and
means for generating, based on the data, program code of the program, the program code including a first state indicator that is associated with the first node and that indicates whether a first execution of a first instance of the first execution task may be scheduled at the first particular hardware resource and whether a second execution of a second instance of the first execution task may be scheduled at the second particular hardware resource.

7. The apparatus of claim 6, further comprising means for allocating an envelope to a requesting node of the graph, wherein the envelope includes metadata and a payload, wherein the metadata includes an envelope type indication, a transport type indication, a timestamp, or a combination thereof, and wherein the payload includes execution task results of an execution task corresponding to the requesting node of the graph.

8. The apparatus of claim 7, wherein the envelope includes a transport flag indicating access rights associated with the envelope, and wherein the transport flag indicates read-only access or read and write access.

9. The apparatus of claim 8, wherein the transport flag is automatically set to indicate read-only access in response to a determination by the means for allocating that an output pin of the requesting node is connected to multiple input pins of the graph, and wherein setting the transport flag to indicate read-only access prevents parallel nodes of the graph from modifying the envelope.

* * * * *